United States Patent
Feinstein

(10) Patent No.: US 6,466,198 B1
(45) Date of Patent: Oct. 15, 2002

(54) VIEW NAVIGATION AND MAGNIFICATION OF A HAND-HELD DEVICE WITH A DISPLAY

(75) Inventor: David Y. Feinstein, Bellaire, TX (US)

(73) Assignee: Innoventions, Inc., Houston, TX (US)

( * ) Notice: Subject to any disclaimer, the term of this patent is extended or adjusted under 35 U.S.C. 154(b) by 0 days.

(21) Appl. No.: 09/543,660

(22) Filed: Apr. 5, 2000

Related U.S. Application Data

(60) Provisional application No. 60/163,755, filed on Nov. 5, 1999.

(51) Int. Cl.$^7$ .................................................. G09G 5/08
(52) U.S. Cl. ........................ 345/158; 345/864; 345/784
(58) Field of Search ................................ 345/158, 159, 345/169, 123, 341, 173–179, 781, 784, 785, 863, 358, 864, 865; 340/990, 995; 178/18.04

(56) References Cited

U.S. PATENT DOCUMENTS

| | | | | |
|---|---|---|---|---|
| 4,812,831 A | * | 3/1989 | Laier ........................... | 345/175 |
| 5,122,785 A | * | 6/1992 | Cooper ....................... | 345/163 |
| 5,142,655 A | | 8/1992 | Drumm | |
| 5,506,605 A | * | 4/1996 | Paley .......................... | 345/163 |
| 5,543,588 A | * | 8/1996 | Bisset et al. .................. | 178/18 |
| 5,602,566 A | * | 2/1997 | Motosyuku et al. ......... | 345/123 |
| 5,734,371 A | | 3/1998 | Kaplan | |
| 6,008,810 A | * | 12/1999 | Bertram et al. .............. | 345/347 |
| 6,057,554 A | * | 5/2000 | Plesko .................... | 235/462.48 |
| 6,088,023 A | * | 7/2000 | Louis et al. ................. | 345/173 |
| 6,121,960 A | * | 9/2000 | Carroll et al. ............... | 345/173 |
| 6,184,847 B1 | * | 2/2001 | Fateh et al. ..................... | 345/8 |
| 6,201,554 B1 | * | 3/2001 | Lands ......................... | 346/169 |
| 6,245,014 B1 | * | 6/2001 | Brainard, II ................. | 600/300 |
| 6,280,327 B1 | * | 8/2001 | Leifer et al. ................. | 345/156 |

OTHER PUBLICATIONS

Jun Rekimoto, "Tilting Interface for Small Screen Computers", UIST'96, 1996.*
G.Levin, P. Yarin Bringing Sketching Tools to Keychain Computers with an Acceleration–Based Interface, CHI98, Extended Abstracts, 1998.*
J.F. Bartlett, "Rock 'n' Scroll is Here to Stay", WRL Research Report 2000/3.*
International Search Report for PCT/US01/10962, 2 pages, (Aug. 02, 2001).

* cited by examiner

Primary Examiner—Richard Hjerpe
Assistant Examiner—Alexander Eisen
(74) Attorney, Agent, or Firm—Akin, Gump, Strauss, Hauer & Feld, L.L.P.

(57) ABSTRACT

System and method for view navigation and magnification of the display of hand-held devices in response to the orientation changes along only two axes of rotation as measured by sensors inside the devices. The view navigation system is engaged and controlled by a single hand which simultaneously presses two ergonomically designed switches on both sides of the hand-held device. In other embodiments, the system engaged into the view navigation mode in response to an operator command in the form of a finger tap, or a voice command, or predefined user gestures. The response curve of the view navigation to sensed changes in orientation is dynamically changing to allow coarse and fine navigation of the view. Various methods are described to terminate the view navigation mode and fix the display at the desired view. Miniature sensors like accelerometers, tilt sensors, or magneto-resistive direction sensors sense the orientation changes. The system can be added to an existing hand-held device via an application interface of the device.

42 Claims, 14 Drawing Sheets

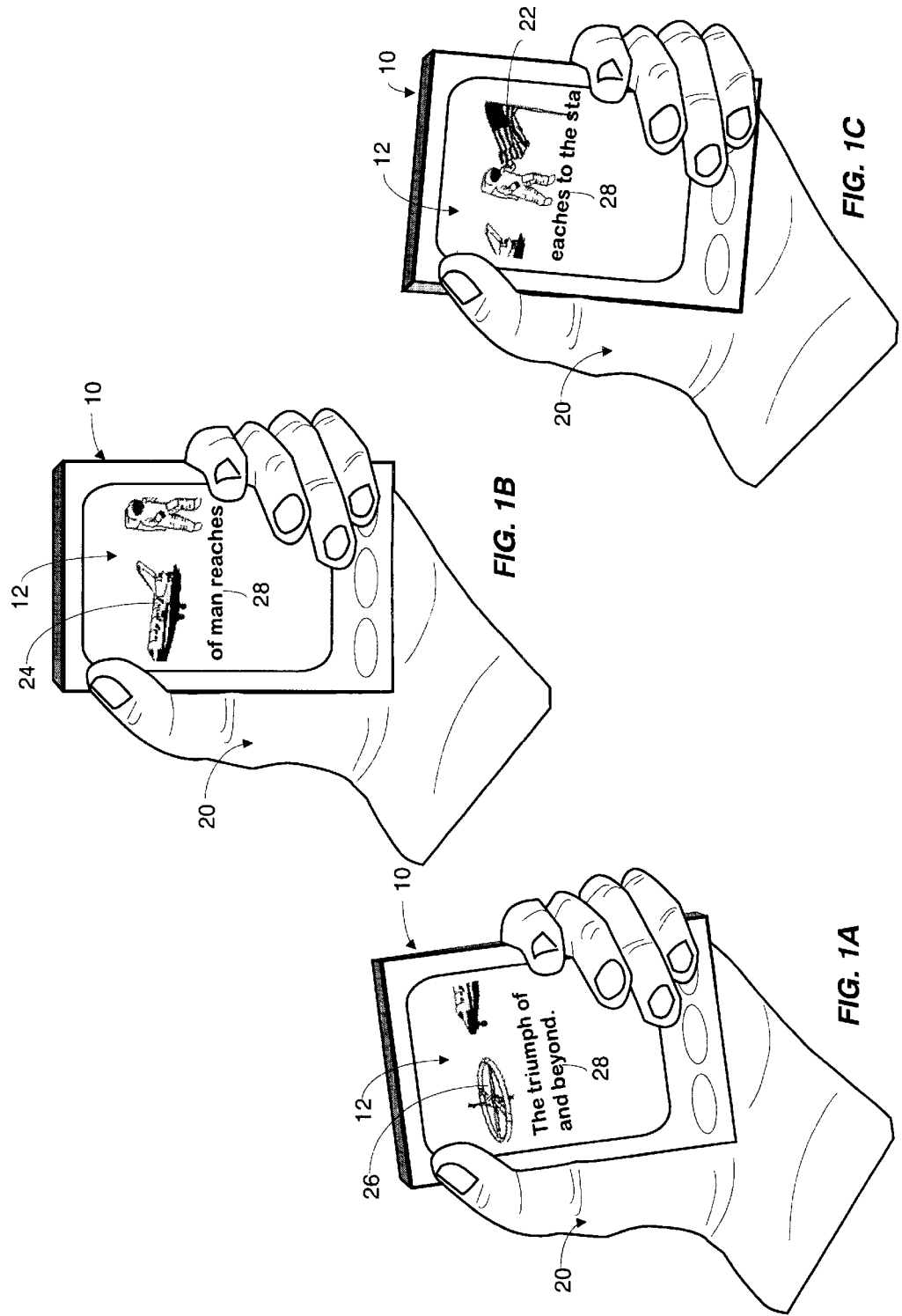

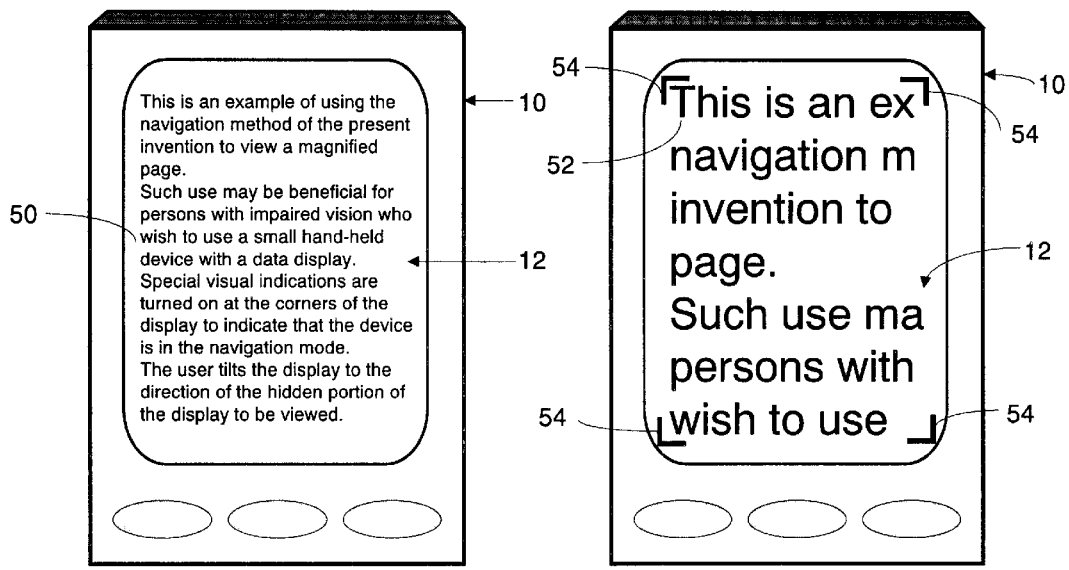
*FIG. 3A*  *FIG. 3B*
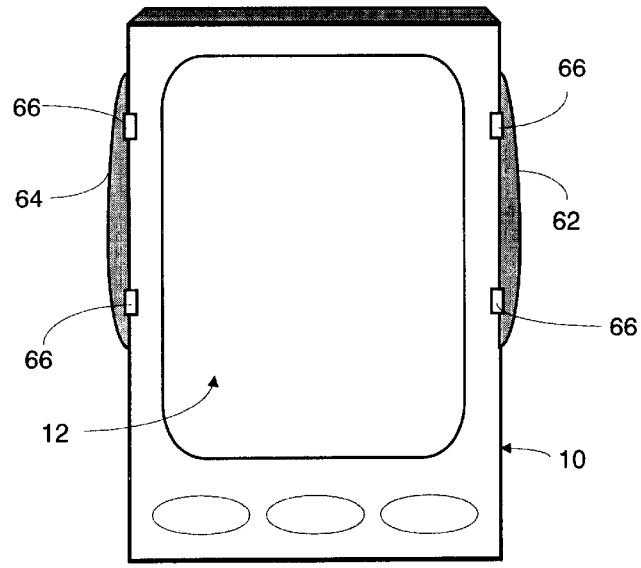
*FIG. 4*

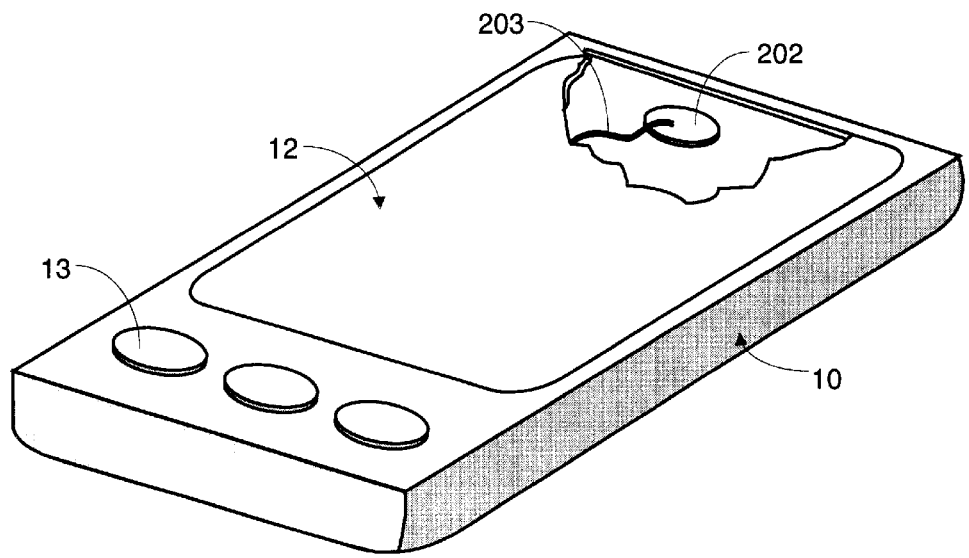
FIG. 9
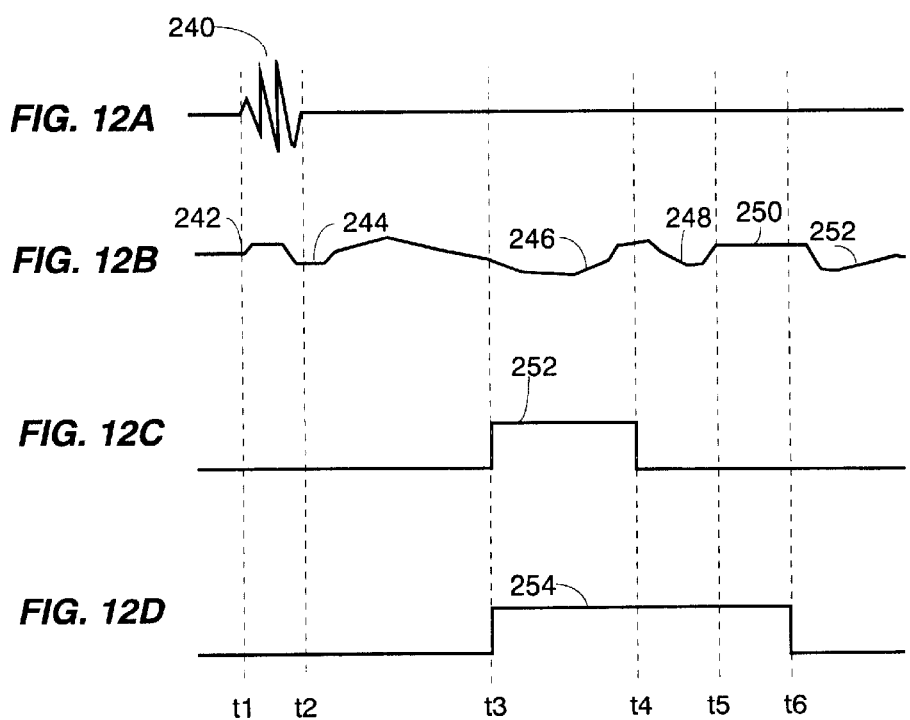

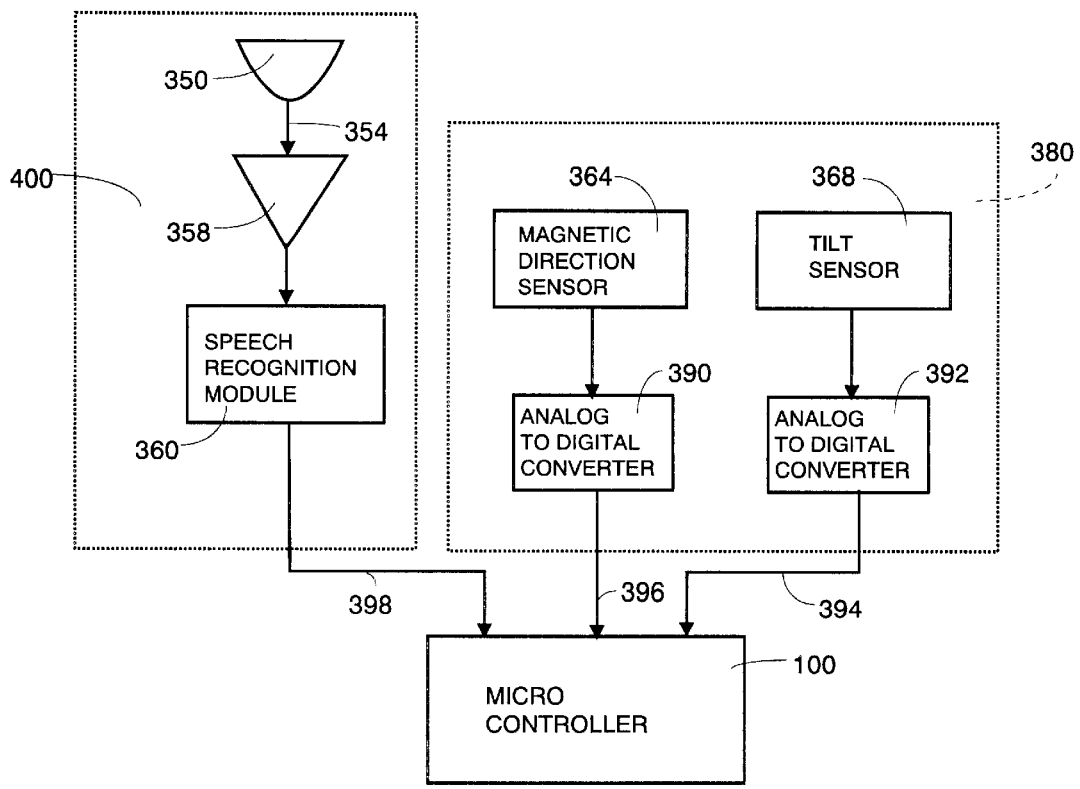
FIG. 11
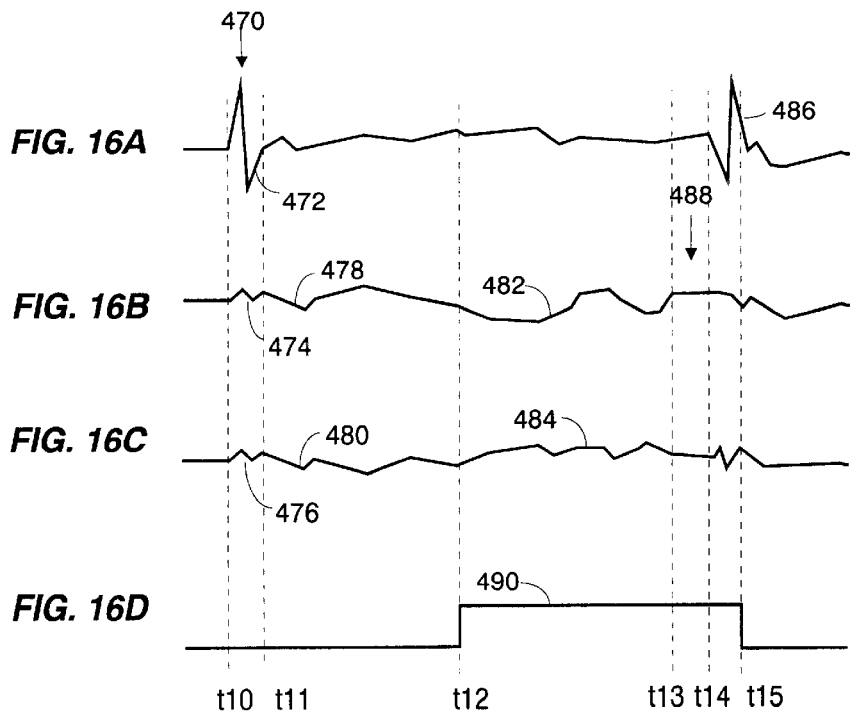

VIEW NAVIGATION AND MAGNIFICATION OF A HAND-HELD DEVICE WITH A DISPLAY

CROSS-REFERENCE TO RELATED APPLICATIONS

This application claims the benefit of provisional application Ser. No. 60/163,755 filed Nov. 5, 1999.

BACKGROUND—FIELD OF THE INVENTION

The present invention relates, in general, to the field of mobile computing and communication hand-held devices utilizing an information display, specifically to view navigation and scrolling of a stored virtual display or a magnified image of the display in response to changes of the orientation at which the device is held in one hand.

BACKGROUND—DESCRIPTION OF PRIOR ART

The rapid miniaturization of complex electronic circuits and the emergence of high-resolution Liquid Crystal Displays have vastly increased the number and variety of smart hand-held devices with information displays. Such devices include hand-held computers, mobile telephones, pagers and other communication and computing solutions. The success of the Internet in recent years has further increased the need for mobile devices that provide a large amount of information to the user on the go.

The vast and varied contents of the Internet allow the user to access large chunks of information. Smart hand-held devices have undergone rapid improvement to enable them to communicate such information to the user. While the processing power, data storage capability, communication speed, and battery life of modem hand-held devices continue to develop at an accelerated pace, it seems that the information flow is limited by the small size of the display. It is clear however, that large displays that are used in desktop and laptop computers cannot be used in a small hand-held device.

Various approaches have been undertaken in order to overcome the display size limitation in hand-held information devices. Web Clipping is an approach taken by Palm Inc. to allow their commercially available Palm Series to browse the Internet. Web Clipping applications were developed for popular web sites, which respond to user's queries by clipping minimal information from the accessed sites in a typically textual form. The disadvantage of Web Clipping is that limited information is brought to the user, and not all web sites have the application to create the web clipping for the user. In many cases, even after clipping, the amount of available information is much more than can fit in one display view.

The use of optical magnification of a small display has been adopted for virtual reality helmets and other applications where the display is seated at a fixed distance from the user's eye. For example, U.S. Pat. No. 5,739,955 discloses such a virtual reality helmet with binocular magnifying optics. Optical magnifiers may appeal to persons with impaired vision who cannot view detailed information in a small hand-held display. However, the main problem with optical magnification when used with a hand-held device is the difficulty of use. Such a hand-held device and its associated optics must be placed at a relatively fixed place in front of the user's eyes so that the magnified display can stay in focus.

Since large virtual displays can be readily stored in the internal memory of the hand-held device, various solutions have been adapted to scroll relatively large amounts of data on a relatively small display. U.S. Pat. No. 3,976,995 (Reissue Patent. 32,365) teaches the use of a processing display which moves the message across the display in a continuous fashion so that the display needs to be only large enough to present a relatively small portion of the total message. While this approach may be useful to display simple sentences, it is not practical when displaying complex graphic information. And even with simple character displays, the user needs to wait patiently while the message is scrolling around.

Another common approach is to equip the device with scrolling keys, usually marked with arrows, to allow the operator to scroll the display in the desired direction. U.S. Pat. No. 5,774,109 discloses a hand-held electronic book with keyboard entry to facilitate the operator's scrolling of the information. The problem with such manual scrolling activity is that it adds a substantial burden to the operator because both hands must be used when reading a large document.

U.S. Pat. No. 5,311,203 discloses a hand-held viewing apparatus that determines the three dimensional direction in which it is pointing and automatically presents information to match the features visible in its field of view. This device is intended to observe, identify and locate stars or stellar constellations in an observed portion of the night sky. Once the exact direction of the device is measured, the device correlates the viewed objects and information stored in its database and displays identifying annotations near the corresponding objects. Since the device must correlate exactly between the database information with the observed objects, an exact spatial angle relative to earth is required, thus making the device prohibitively complex and expensive.

An article titled "Situated Information Spaces and Spatially Aware Palmtop Computers", by George W. Fitzmaurice, Communication of the ACM, 36(7), July 1993, pp. 38–49, teaches how a small, portable and spatially aware palmtop computer can act as a window onto a 3D-situated information space. The article teaches the use of a complex sensor with six degrees of freedom, which provides complete orientation and position information so that the display can navigate the said information space. In an active map application suggested in the article, the experimental unit serves as an electronic information lens for a wall-mounted map. As the unit is moved around the map, information relating to the map's location just under the device is shown in the unit's display. Other applications like a computer-augmented library and portable surrogate office are disclosed, in which the unit provides information based on the position and orientation of the hand-held display. Like the previously discussed patent, the main disadvantage of this solution is the need of an elaborated 6D sensor which in turn requires the use of complex computing to determine both orientation and location of the moving device and correlate such location and orientation to the stored information space. In fact, the author's prototype required the use of an advanced desktop workstation to perform said computing.

BRIEF SUMMARY OF THE INVENTION

With these problems in mind, the present invention seeks to provide a user friendly and convenient navigation of displayed information in a hand-held device, so that a large amount of data can be viewed in the relatively small size of the device's display. In particular, the present invention allows the operator to perform such navigation of the display view using the same hand that holds the device.

A hand-held device in accordance with the present invention has a housing with a display, memory means to store a virtual display, processing means, and an orientation sensor responsive to changes in the spatial orientation at which the device is held. The display can be set at a navigation and scrolling mode or at a fixed mode. When the view navigation mode is set, the display scrolls the stored virtual display under the direction of the processing means in response to the changes in the orientation of the device measured by the orientation sensor.

When set to the fixed mode, the display remains fixed and no longer follows the changes in orientation. The display provides a clear visual indication during the view navigation mode in order to alert the operator that it will scroll in response to changes in the orientation of the device.

Pursuant to a specific embodiment of the present invention, the device further comprises a set of two ergonomic switches placed along both sides of the housing so that the operator must press both switches during the view navigation mode. Such arrangement ensures convenient activation of the view navigation mode, as it is natural for the holding hand to press both switches at the same time. Also, the requirement that both switches must be pressed in order to activate the view navigation mode better protects against unintentional change of the displayed view.

In another embodiment of the present invention, said ergonomic switches are replaced with means to detect a tap by the operator's finger at the bottom of the device as an instruction to set said view navigation mode after a short time delay. Once the view navigation mode is set, it remains in this mode for a preset period of time or as long as the operator substantially changes the orientation of the device.

In yet another embodiment of the present invention, preset hand gestures by the operator, as measured by a set of orientation sensors augmented with an additional height sensor or acceleration sensor, communicate special commands to the hand-held device. For example, a quick upward jerk of the hand-held device without substantial change in orientation might be used to set the device to the view navigation mode.

In still another embodiment of the present invention, a built-in voice recognition means accepts a spoken word command from the operator to enter said view navigation mode.

It is therefore an object of the present invention to provide convenient navigation means for scrolling a virtual display stored in a hand-held device using only one hand.

The present invention is particularly suitable for a display magnification application. Once set to magnification mode, the current view on the display can be arbitrarily magnified even by a large factor, and then using the view navigation mode to navigate the enlarged view on the display.

It is a further object of the present invention to provide such single-hand navigation means with the same convenience for both right-handed and left-handed users.

It is another object of the present invention to use a minimal arrangement of axial rotation sensors that respond only to changes in only two axes of orientation of the hand-held device.

It is yet another object of the present invention to minimize exact correlation between orientation changes and actual navigation of the display in order to allow the use of relatively low cost coarse sensors to determine said orientation changes.

It is also an object of the present invention to provide smart response curves that change the correlation between orientation changes and actual navigation of the view in a dynamic fashion, which can also be setup in accordance to user preferences.

It is a further object of the present invention to use semi-conductor sensors that may be readily integrated into the single chip design of modem hand-held devices.

It is still another object of the present invention to allow users with impaired vision or persons suffering from far-sighted vision to conveniently magnify and navigate the display of a small mobile hand-held device.

It is still a further object of the present invention to be adapted for manufacturing as an easy to add upgrade circuitry for the vast variety of palmtop computing and hand-held communication devices that are already existing on the market.

These and other objects, advantages, and features shall hereinafter appear, and for the purpose of illustrations, but not for limitation, exemplary embodiments of the present invention are described in the following detailed description and illustrated in the accompanying drawings in which like reference numerals designate corresponding elements.

BRIEF DESCRIPTION OF THE DRAWINGS

In the drawings, closely related figures have the same number but different alphabetic suffixes.

FIG. 3 illustrates the use of the present invention as a magnifier for the display of a hand-held device in accordance with the present invention.

FIG. 4 shows an ergonomic embodiment of the present invention that uses two side switches to activate the view navigation mode.

FIG. 9 is a perspective view of the hand-held device of FIG. 8 showing a cutaway view of the finger tap sensor.

FIG. 11 shows yet another embodiment of the present invention that uses different sensors to track the orientation, and uses a speech recognition module to accept spoken commands to enter and exit view navigation mode.

FIG. 12 is a timing chart illustrating how the view navigation mode is entered and exited in accordance with the present invention.

FIG. 16 is a timing chart illustrating the use of the embodiment of the present invention of FIG. 14 with three accelerometers.

DETAILED DESCRIPTION OF THE INVENTION

This invention allows hand-held communication or computing devices with a relatively small display to conveniently navigate a large stored virtual display with one hand. Such devices may include mobile computers like the commercially available PALM PILOT, Cassiopea, PSION, Newton, and other palmtop computers. It may also include various PDA devices, mobile hand-held terminals, advanced pagers, and a variety of mobile telephones with expanded information displays.

The hand-held device in accordance with the present invention employs two operational modes, which throughout this document are referred to as view navigation mode and fixed mode. When set to the view navigation mode, the display view is automatically scrolled to follow the rotational movements of the holding hand. When set back to the fixed mode, the display view becomes stationary and no longer follows said movements of the hand.

Figure 1D:
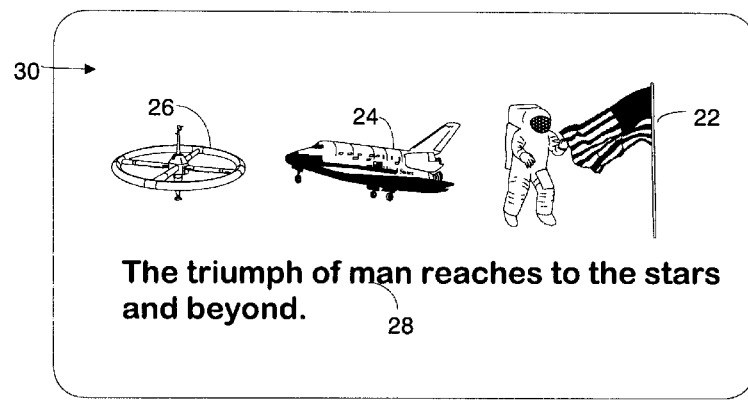
FIG. 1A, FIG. 1B, and FIG. 1C show three subsequent views of a hand-held device incorporating the present invention when it is rolled from left to right while navigating the virtual display of FIG. 1D.

FIG. 1 shows an overview of the operation of a hand-held device 10 built in accordance with the present invention when it is set to the view navigation mode. The device has a flat display 12 that is typically made of a LCD with optional back lighting, and a plurality of operational keys. The display 12 is too small to show the entire virtual display 30 that is stored in the hand-held device and is shown in FIG. 1D. For illustration, the virtual display 30 shows a combination of easily identified graphical objects like a space station 26, a space shuttle 24, and an astronaut with the American flag 22, in addition to a character message 28.

In FIG. 1A, the navigation process is started when the operator's hand 20 rolls the device 10 to the left so that the display 12 shows the left portion of the stored virtual display 30. As the operator's hand 20 rolls to the right, FIG. 1B shows how the view in the display 12 scrolls to the left, as the space shuttle picture 24 comes into view. FIG. 1C further shows how the right portion of the virtual display 30 including the American flag 22 is viewed when the operator's hand 20 continues to roll to the right.

Figure 2:
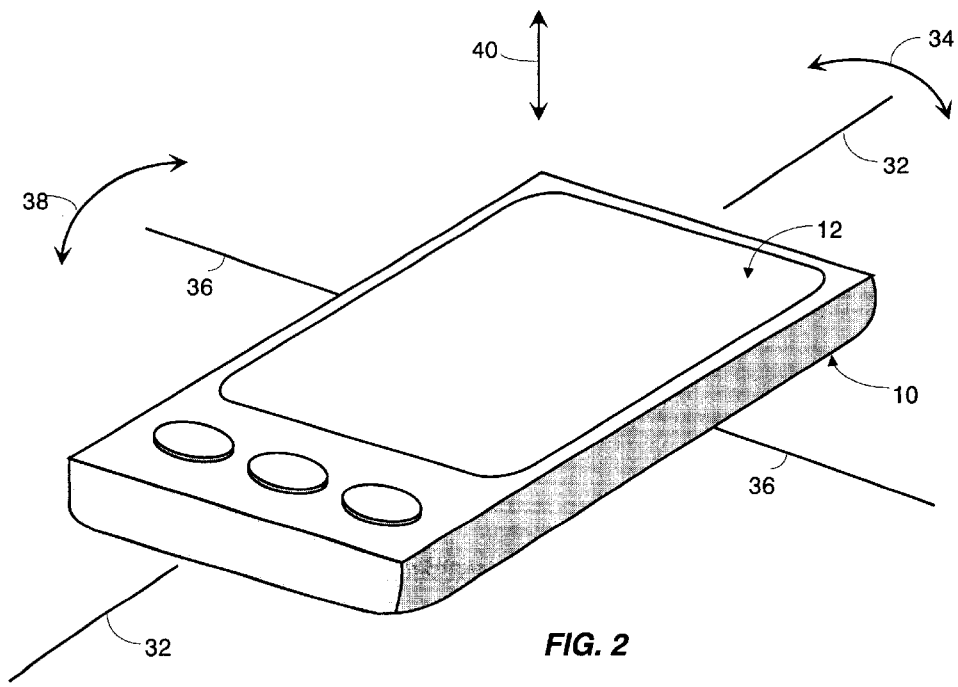
FIG. 2 indicates the relative axes of roll and pitch along which the hand-held device is rotated in order to navigate the view in accordance with the present invention.

FIG. 2 indicates the relative axes of orientation along which the hand-held device 10 is rotated in order to navigate the display 12 in accordance with the present invention. Throughout this document, I will refer to axis 32 as the Y-axis or, with influence from aviation and naval terms, the roll axis. Similarly, I will refer to axis 36 as the X-axis or the pitch axis. In one embodiment of the present invention, changes in the height at which the device 10 is held, and which are measured along the Z-axis 40, are used to switch the view navigation mode on. Referring back to the process shown in FIG. 1, it should be clear even though not shown in this drawing, that the display can be navigated vertically as the device 10 is tilted back and forth along the pitch axis.

While the scrolling of the display follows the changes in the orientation of the device, the rate of scrolling as well as the amount of scrolling need not follow the exact amount of change in orientation. As will be discussed below, the control software of the present invention smoothes the hand movements to provide convenient navigation even when using relatively coarse orientation sensors.

FIG. 3 illustrates how the present invention is well adapted to provide display magnification and navigation of said magnified display. FIG. 3A shows a hand-held device that displays some information 50, which may not be viewable by a user who suffers from impaired vision. When the user instructs the device 10 to magnify the view, the display 12 shows a magnified portion 52 of the original information 50 as shown in FIG. 3B. The device 10 can now navigate the magnified view in accordance with the present invention. When set to view navigation mode, the display preferably includes some visual indication 54 to the operator, to alert that the display will be scrolled as the operator changes the device orientation. The indication shown in the drawing depicts four rotated 'L' shaped 54 markers at the four corners of the display 12. It can be, of course, any other form of visual indication with an optional audible beep if the device 10 is equipped with a sound output means. As will be discussed below, the visual indication 54 immensely benefits those embodiments of the present invention that do not use an actual switch for entering and leaving the view navigation mode.

It should be noted that for a magnification application for persons with impaired vision, the display should employ an active TFT LCD or some other display technologies that exhibit sharp contrast features.

FIG. 4 shows an ergonomic embodiment of the present invention that uses two side switches 62 and 64 to activate the view navigation mode. The drawing illustrates mechanical switches that utilize springs 66 to provide tactile response to the operator. Other tactile switches like the sealed membrane type and capacitance strip switches may be used. The hand-held device 10 is set to the view navigation mode only when both switches are pressed by the operator, and it reverts back to fixed mode when at least one of the switches is disengaged. Alternatively, the switches can be used to signal a command to enter the view navigation mode and allow the program to terminate the mode in accordance with the description below. While the present invention will work with one switch only, experimentation showed that this arrangement of two side switches is more ergonomic and provides better intuitive control to the operator. The use of two switches on both sides of the hand-held device seems to equally benefit both right-handed and left-handed persons.

Figure 5:
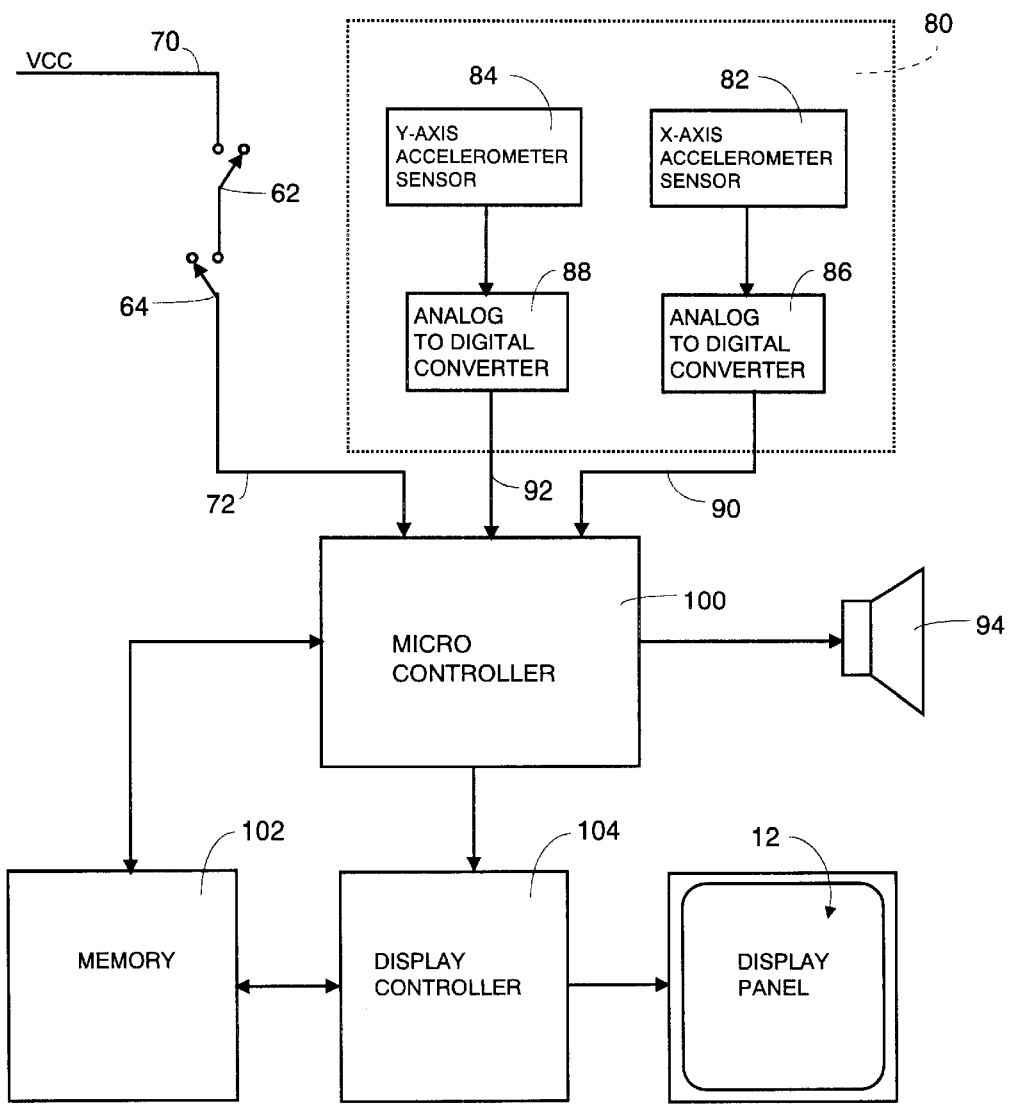
FIG. 5 is a block diagram of the embodiment in FIG. 4.

FIG. 5 is a block diagram of the embodiment in FIG. 4, where the view navigation circuitry of the present invention is fully integrated into the main circuitry of the hand-held device. All smart hand-held devices with displays 12 typically employ at least one micro-controller 100 or a microprocessor, memory 102 to store program and display data, and a display controller 104. For clarification purposes, common components like a power source and a keyboard interface are omitted from this and all other drawings.

Orientation sensor circuitry 80 includes X-axis 82 and Y-axis 84 accelerometers that are respectively mounted inside the hand-held device to align with axes 36 and 32 of FIG. 2. Because the view navigation according to the present invention provides a close loop between the user's movements and the actual navigation, there is no need for an exact alignment between the sensor and the device axes. In fact, it is enough that the two sensors will be generally perpendicular to each other. Also, any misalignment among the sensor axes of sensitivity and the device's X and Y axes can be corrected by the program. Such accelerometers are preferably implemented by a surface micro-machining technique that builds electromechanical structures in silicon. The small size of micro-machined structures makes it economical to place the circuitry and sensors on the same die. For example, a commercially available 1 micrometer CMOS process known as "iMEMS" from Analog Devices Inc. created the ADXL202 accelerometer which incorporates two axes and circuitry to digitally generate a duty cycle modulator (DCM) output. Such DCM or other analog to digital conversion 86 and 88 are used to interface the orientation data to the micro-controller 100. The accelerometers provide tilt angle information depending on their inclination relative to earth gravity. When the operator is moving, there are also small acceleration artifacts picked up by the accelerometers. The program can filter out such acceleration artifacts, or the operator may re-navigate the view to correct undesired view movements.

The right switch 62 and the left switch 64 are connected in series to the VCC potential 70 (or a ground potential if reverse logic is used) so that when both are pressed, they connect an activation signal to the micro-controller 100 via line 72. This signal instructs the program of the micro-controller to set to the view navigation mode. If the hand-held device includes a beeper 94, the program can provide a beep to alert the operator that the view navigation mode is set. The micro-controller instructs the display controller 104 to provide a visual indication 54 as shown in FIG. 3B to the operator that the hand-held device is in the view navigation mode.

During the view navigation mode, the micro-controller 100 translates the changes in pitch and roll orientation as communicated through lines 90 and 92 to navigation commands that scroll a virtual display which is stored in memory 102. For example, when the Y-axis accelerometer indicates that the operator has rotated the hand-held device 10 like in FIG.1B to the right, the micro-controller 100 controls the virtual display in the memory 102 and the display controller 104 to scroll the view in the display 12 to the right.

Figure 6:
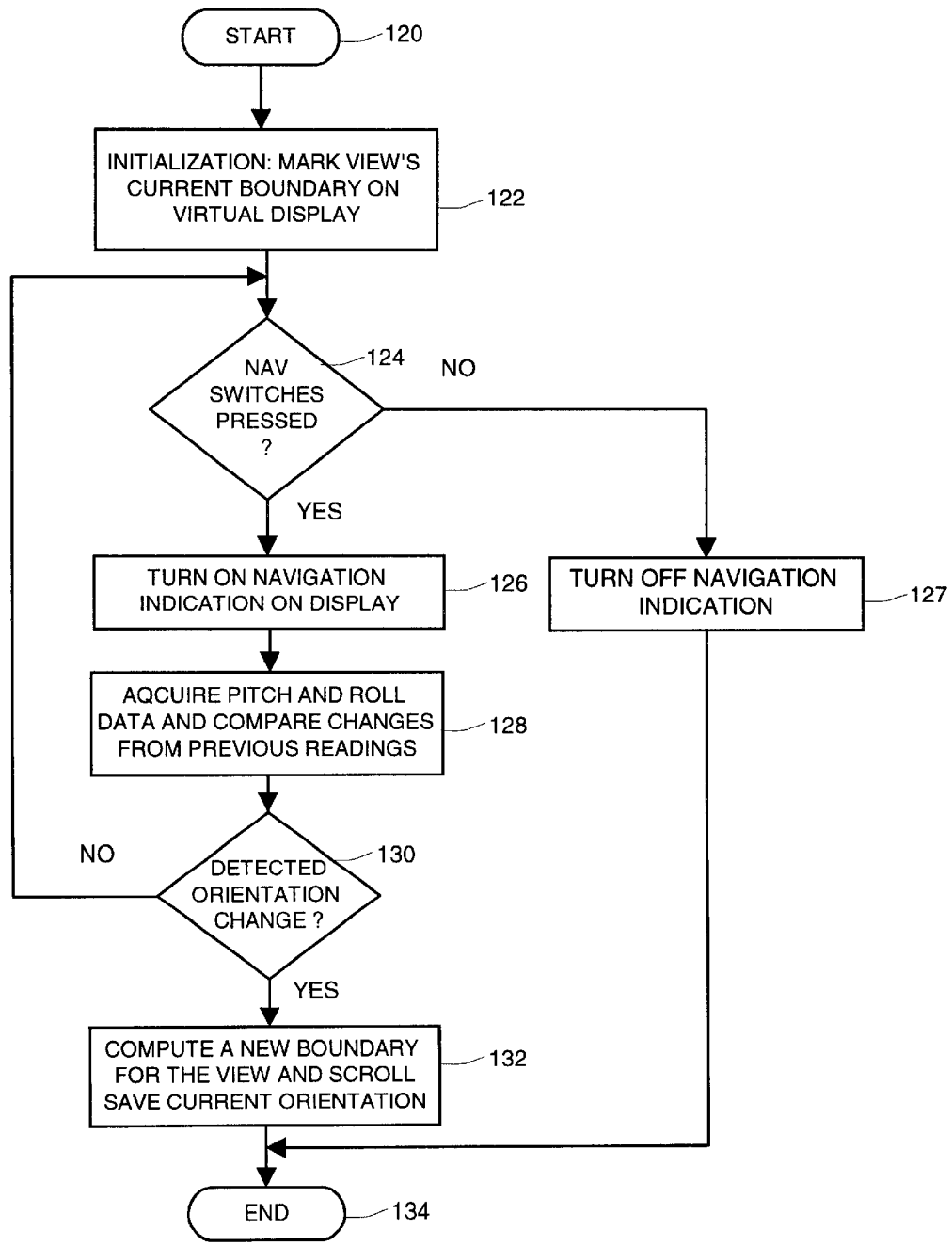
FIG. 6 outlines the software flow diagram for the embodiment of the invention of FIG. 5.

FIG. 6 outlines the software flow diagram for the embodiment of the invention of FIG. 5. The flow from start 120 to end 134 is performed several times a second in a standard polling process of the micro-controller 100. At the initialization step at block 122, the current boundary of the display view is marked in comparison to the stored virtual display. The status of both navigation switches 62 and 64 are checked at block 124. If both switches are pressed, the system is set to view navigation mode in block 126 providing the visual indication 54 to alert the operator that changes in orientation of the hand-held device will navigate the display.

At block 128 the pitch and roll data are acquired, stored and compared to the previous reading. If a change in orientation is detected at block 130, the program computes the new boundary for the view at block 132. It also refreshes the display to show the new view and it saves the new current orientation as the basis for comparison in the next iteration of the process. The process ends at block 134 until it is polled again. If the check for pressed switches at block 124 indicates that at least one switch is not pressed, the program turns off the navigation indication 54 and the process ends at block 134 until it is polled again.

The program can be set with different response curves for computing the new boundary in response to changes in orientation at block 132. Fine or coarse modes of response can be set by the operator or can be changed dynamically during the time the system is in view navigation mode. With fine response, the display view navigates the virtual display at a relatively slow rate in response to the orientation changes. With coarse response, the display view changes rapidly in response to the orientation changes.

Figure 7:
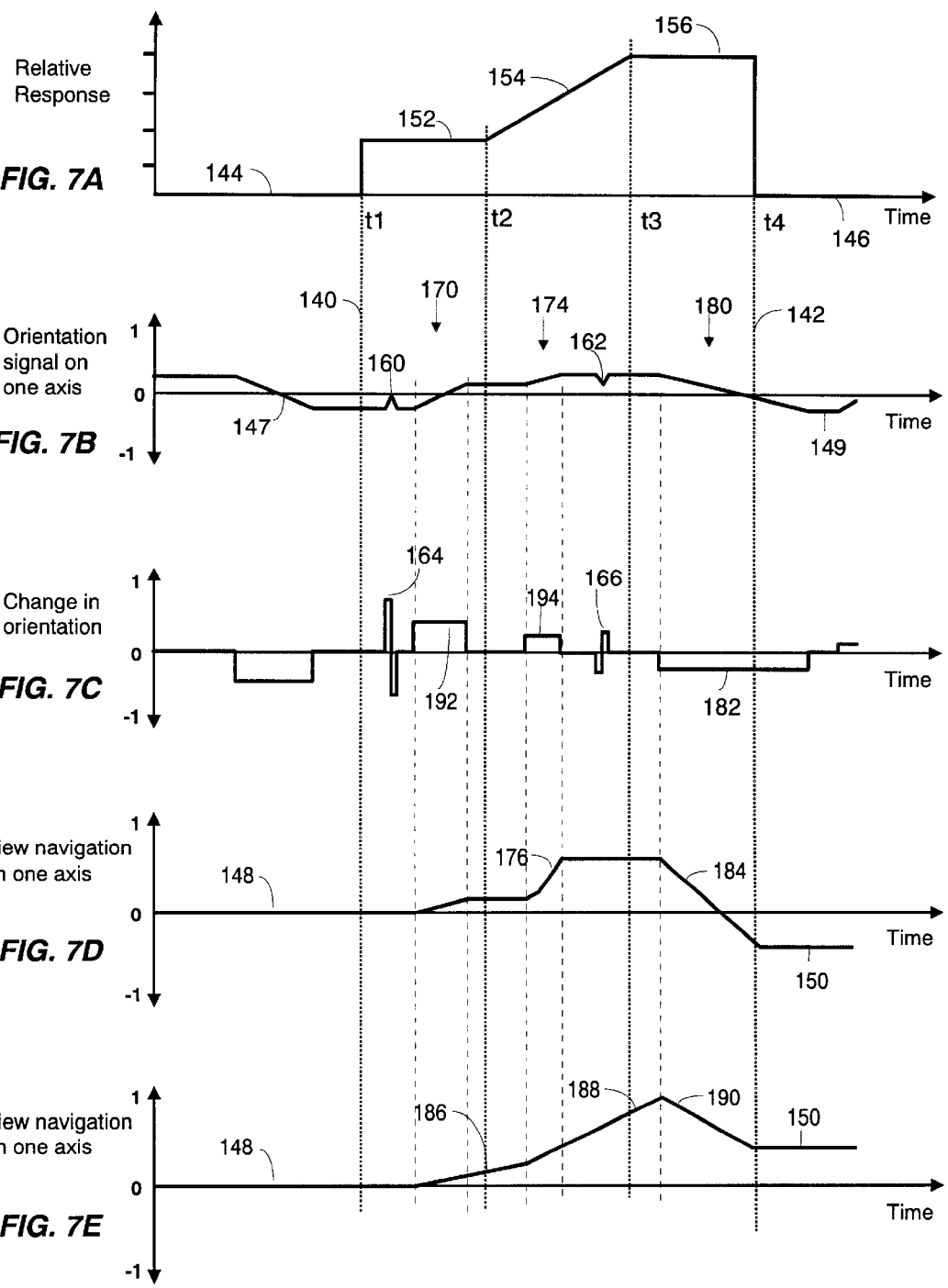
FIG. 7 is a timing chart showing an example of the time dependent response curve of the system to changes in orientation along one axis.

FIG. 7 is a timing chart showing an example of the time dependent response curve of the system to changes in orientation along one axis. Similar relations are employed along the other orientation axis, although response figures may be set with different biases to each axis. FIG. 7A shows the relative response curve that is setup onto the program and may be modified by the operator. The relative response is obtained by dividing the amount of change in view navigation, which is a normalized figure proportional to what percentage of the virtual display has been scrolled, to the change of orientation that caused it. Thus, the operator can achieve fine and slow navigation when the relative response figure is low, and coarse and fast navigation when the relative response figure is high. FIG. 7B illustrates the reading from the orientation sensor on one axis as represented by the signal on line 90 or 92 of FIG. 5. FIG. 7C shows the time corresponding changes in orientation along the monitored axis as measured by the micro-controller 100 at block 128 of FIG. 6. FIG. 7D illustrates the resulting navigation of the view along the monitored axis as computed by the micro-controller 100 at block 132 in accordance with one mode of operation. FIG. 7E illustrates the resulting navigation of the view along the monitored axis as computed by the micro-controller 100 in response to the same stimuli but in accordance with an alternate mode of operation.

FIG. 7A indicates that the device was switched to the view navigation mode at time t1 140, and switched back to the fixed mode at time t4. During the fixed mode periods 144 and 146 of the drawing, the view remain fixed on the display during the corresponding periods 148 and 150 in FIG. 7D and FIG. 7E, even though the orientation sensor reports orientation changes 147 and 149 in FIG. 7C. In this example, from time t1 until time t2, the relative response of the system is set to fine navigation 152. After time t2, the relative response is gradually increasing 154 until time t3 where the relative response becomes coarse 156.

During the view navigation mode, a filtering algorithm cleans the orientation data from jerks and other orientation "noises". For example, while unintentional noise 160 and 162 in FIG. 7B results in corresponding orientation change pulses 164 and 166 in FIG. 7C, the program actually ignores them and does not navigate the view as shown in FIG. 7D and FIG. 7E.

FIG. 7D illustrates the view navigation response when using a mode of operation that changes the navigated view only during a period of orientation changes. During the period 170, which occurs during the fine navigation, an orientation change is detected and the view is slowly navigated in response. During the period 174, while the relative response is dynamically changing to the coarse navigation, the view navigates at an accelerated rate 176. During the period 180, which occurs during the coarse navigation, a relatively slow orientation change 182 results in a rapid navigation 184 of the view. In this operation mode the view remains stationary in the absence of orientation changes.

FIG. 7E illustrates the view navigation response when an alternate continuous mode of operation keeps the view navigating at the rate and direction which was established during the last valid orientation change. Again, during the period 170, which occurs during the fine navigation, an orientation change is detected and the view is slowly navigated 186 in response. However, the view continues to navigate in the same direction until a change in orientation occurs again in period 174. A new navigation rate 188 in the same direction but at a rate responsive to the reduced orientation rate change in period 174 is multiplied by the increase relative response at 154. This navigation continues until period 180, which occurs during the coarse navigation. At that time, a relatively slow orientation change 182 results in a rapid navigation 190 of the view. The program employs a minimum response threshold to allow the navigation to stop when the operator slightly reverses the direction of orientation. Other modes of operation can be established as variants of those shown in FIG. 7D and FIG. 7E.

Such a response curve with at least two settings of fine and coarse navigation, which can be setup and adjusted for the individual preference of the operator, allows exact view navigation. At first, the operator presses the switches until the coarse navigation is activated 156 and the general area of the desired view is accessed. At that point the operator can reach fine navigation by simply deactivating the switches and then activating them again. Other response curves may be a fixed value, or may toggle from fine to coarse navigation at each subsequent entry to view navigation mode.

It is also possible to use multi-state switches instead of the simple switches 62 and 64 of FIG. 5 to allow the operator to select coarse and fine response directly. Yet, using a dynamically changing response as described allows certain simplicity of the design.

Another solution is to eliminate the switches altogether and to monitor the pitch and roll changes for user specific gestures that will activate the view navigation mode. In such an embodiment of the present invention, the program will keep an ongoing track of the roll and pitch orientation in storage and will analyze it continuously to see if the operator's gestures have been detected. It seems that for a more reliable activation of the view navigation mode, an additional sensor is required.

Figure 8:
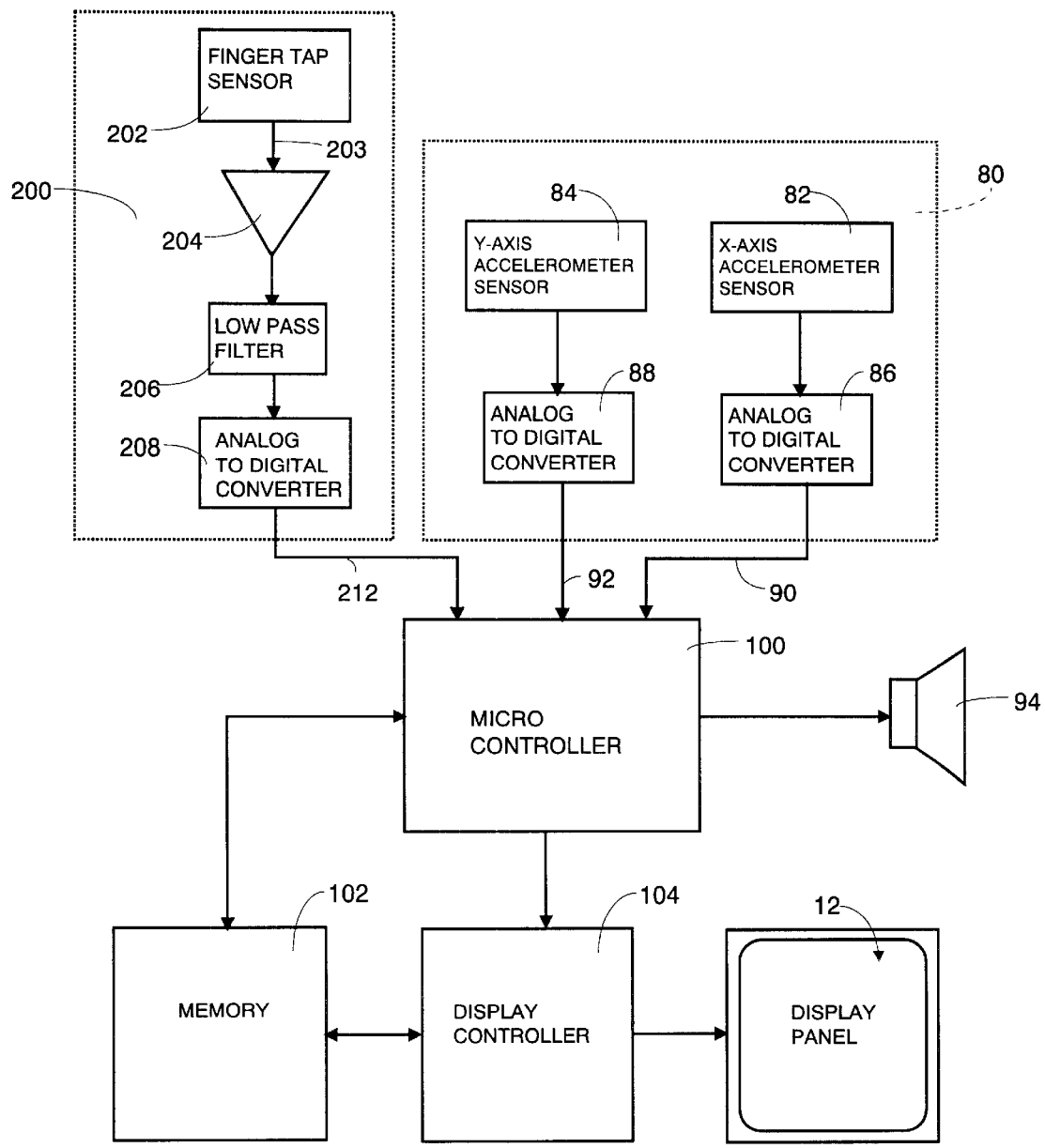
FIG. 8 is a block diagram of another embodiment of the present invention that uses a finger tap of the operator to set the hand-held device into view navigation mode.

FIG. 8 is another embodiment of the present invention that substitutes the switches 62 and 64 with an activation detector 200 that responds to a finger tap of the operator to set the hand-held device into view navigation mode. The finger tap detector includes a sound/vibration transducer 202 to sense the finger tap and to output a voltage that represents the sensed tap vibrations. The output of the sensor 202 is connected by wire 203 to the input of amplifier 204. The amplifier 204 is set up with a certain threshold to insure that only signals above the threshold are amplified. The amplified output of amplifier 204 is filtered by a low pass filter 206, whose output is connected to the analog-to-digital converter 208 to provide digital data to the micro-controller 100 via connection 212. Once the micro-controller receives a signal on line 212, it tries to match its frequency and length to the stored characteristics of a finger tap signal. If a match is detected, the program sets the device to the view navigation mode after a preset delay from the end of the finger tap signal. Once in the view navigation mode, the micro-controller 100 uses the orientation change information from the orientation sensor 80 to navigate the display 12 in a similar way to the discussion of FIG. 5.

The finger tap sensor can be an electret condenser microphone or a piezoelectric transducer. Both types of sensors are relatively low cost and easy to manufacture. FIG. 9 is a perspective view of the hand-held device 10 in accordance with the embodiment of FIG. 8 showing a cutaway view of the finger tap sensor 202. The finger tap sensor 202 is attached to the bottom of the housing of the device 10, or it may be placed in the area just beneath the top side of the display 12 where the operator's finger is likely to tap while the device is held by one hand. The sensor 202 is connected by wire 203 to the circuitry described above. Proper amplification can insure that the device will detect all relevant finger taps at the bottom. Such finger taps produce vibrations and sound patterns that are significantly different from the sound that may be created by stylus strikes on the screen or the activation of a key 13. The micro-controller can distinguish a finger tap sound from other noises such as those created when the device is placed on the table. For more efficient manufacturing, the finger tap sensor 202 can be surface mounted to the bottom of the PCB assembly 450 inside the device 10.

Figure 10:
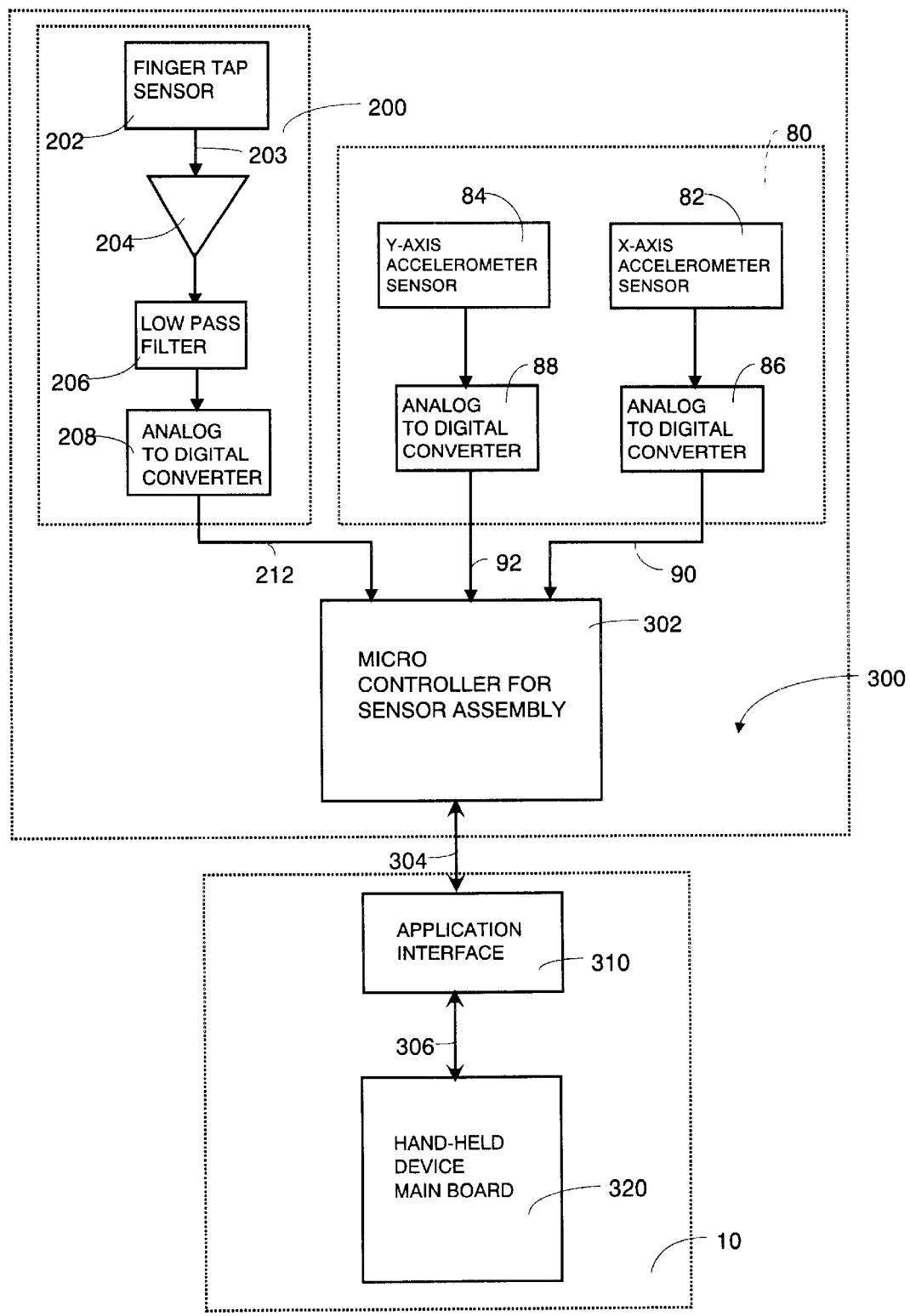
FIG. 10 is the block diagram of the embodiment of the present invention in the form of an add-on upgrade to an existing hand-held device.

Since there are a large variety of smart hand-held devices with displays already on the market, it is desirable that the present invention be adapted as an add-on upgrade device. FIG. 10 is the block diagram of the embodiment of the present invention in the form of an add-on upgrade 300 that is attached to an existing hand-held device 10. The add-on upgrade 300 is built on a miniature PCB that is connected to the mobile device 10 externally or internally, depending on the expansion capability of said hand-held device.

Figure 14:
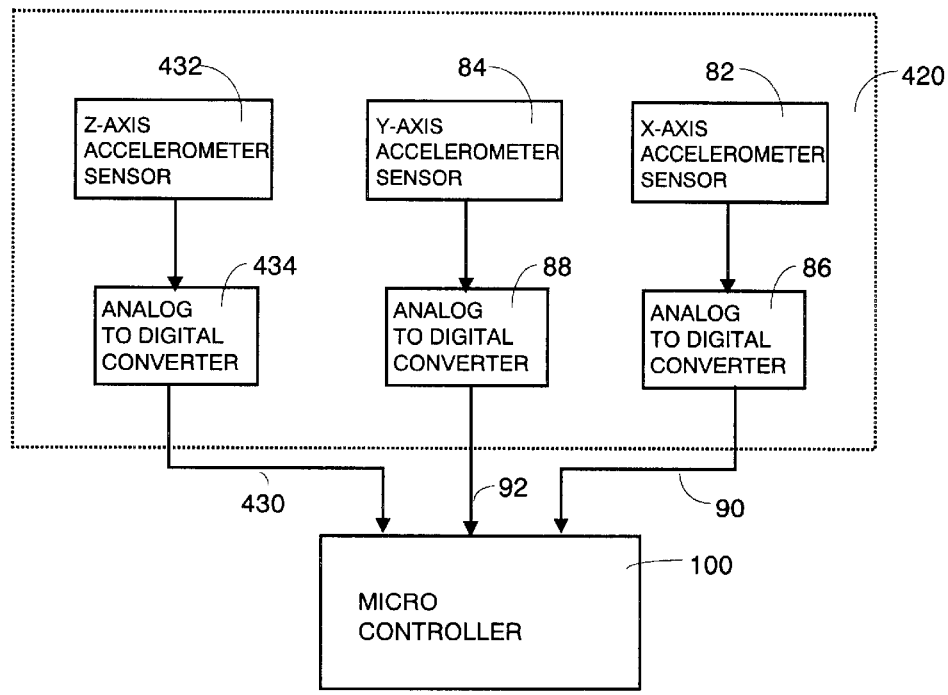
FIG. 14 illustrates a further embodiment of the present invention that uses an additional Z-axis accelerometer to identify the operator's vertical hand gestures to enter the view navigation mode and for other commands.

The add-on upgrade 300 comprises the sensors described in other embodiments of the present invention, as well as a standard micro-controller 302. Such a micro-controller typically includes its own stored program and data memory as well as a communication channel 304 like UART, SPC, and 12C. The micro-controller 302 receives the orientation changes information in lines 90 and 92 as well as the signal to enter or exit the view navigation mode 212. Processing the orientation change data and navigation entry command as explained above, the micro-controller computes the desired navigation changes for the device's display and provides commands to the hand-held device via the communication channel 304. The commands, which might be in the form of a serial protocol, interface to the hand-held device via the application interface port 310. These commands are further communicated to the processor on the main board 320, with instructions on how the main board processor needs to navigate the display. All other implementations of the present invention as shown in FIG. 5, 11, and 14 can be also implemented as an add-on upgrade in similar arrangement to FIG. 10.

The advantages of using the finger tap detector to command the entry to the view navigation mode is that it is less costly to manufacture than the side switches of FIG. 4. It is also easier to add a view navigation system with a finger tap sensor to an existing hand-held device.

FIG. 11 shows yet another embodiment of the present invention that uses different sensors. The orientation sensor assembly 380 that includes a magnetic direction sensor 364 and a tilt sensor 368 replaces the accelerometer based orientation sensor 80 of FIG. 8. Various devices are commercially available for measuring the magnetic direction of the device. For example, magneto-resistors placed along axes 32 and 36 will produce orientation indications as the device is moved relative to the magnetic field of the earth. Tilt sensors may be comprised of a potentiometer and a small weight coupled to the potentiometer that is free to rotate on a fixed axis around which the tilt is measured. Other types of commercially available inclinometers are made of small, liquid-filled variable resistors that change their resistance based on their inclination. Other type of orientation sensors known to the art, like laser gyros, may be used instead of the accelerometers 82 and 84. Yet another embodiment may employ several sets of magneto-resistors to measure orientation changes in two degrees of freedom without the use of an inclinometer or the accelerometers.

The navigation command unit uses a speech recognition module 400 instead of the finger tap sensor 200 of FIG. 8 to command the micro-controller 100 to enter into view navigation mode. The speech recognition module may already be a part of the hand-held device 10 regardless of the view navigation feature, and as such can be used to allow the operator to enter the view navigation mode verbally, while still holding the device in one hand. For clarity purposes, FIG. 11 omits the display 12, the display controller 104 and the memory 102 which are still connected to the micro-controller 100 as shown in FIG. 8 and FIG. 5.

In comparing FIGS. 5, 8, 11, it should be clear that various combinations can be utilized to implement the present invention. For example, the magnetic direction sensor 364 and tilt sensor 368 can replace the accelerometers 82 and 84 in FIG. 5. In another embodiment, the speech recognition circuitry 400 may be used instead of the finger tap detector 200 of FIG. 8, or the accelerometers 82 and 84 of the embodiment of FIG. 8 can replace the orientation sensor of FIG. 11. Selection of the sensor should be made with a consideration of the overall structure of the hand-held device. In most applications, the devices that do not require moving parts and may be integrated into the silicon die of the main unit will most likely prove the most cost efficient.

FIG. 12 is a timing chart illustrating how the view navigation mode is entered and exited in the embodiments of the present invention that use the finger tap sensor of FIG. 5. The signal received from the sensor 202 on line 203 is shown in FIG. 12A. FIG. 12B shows the signal that represents the change of orientation along one axis. The signal 240 representing a finger tap is detected between time t1 and t2. A sufficiently large time delay of t3-t2 is introduced by the micro-controller to eliminate any wrong orientation change readings that result from the finger tap motion. The orientation change signals 242 and 244 are likely an artifact of the tapping by the operator. At time t3, the micro-controller sets the device to the view navigation mode and alerts the operator with the visual indication 54. FIG. 12C and FIG. 12D are logic signals indicating with logic "high" that the device is set to the view navigation mode. FIG. 12C illustrates a navigation exit method by which the device remains at the view navigation mode 254 for a preset time of t4-t3. At time t4, the view navigation mode terminates to fix the displayed view. If more navigation is required, the operator repeats the process by tapping again at the bottom of the device. FIG. 12D illustrates another navigation exit method by which the device remains at the view navigation mode 256 as long as the operator changes the orientation of the device. During the time period 246, the operator rotates the device in one direction, and during time period 248, the operator changes the direction of rotation. During the time period 250, which is equal to t6-t5, the operator keeps the device relatively steady, and therefore, the micro-controller terminates the view navigation mode 246 at time t6. The display will not navigate in response to renewed orientation changes 252.

The timing diagram of FIG. 12 can be used for other embodiments of the present invention.

Figure 13A:
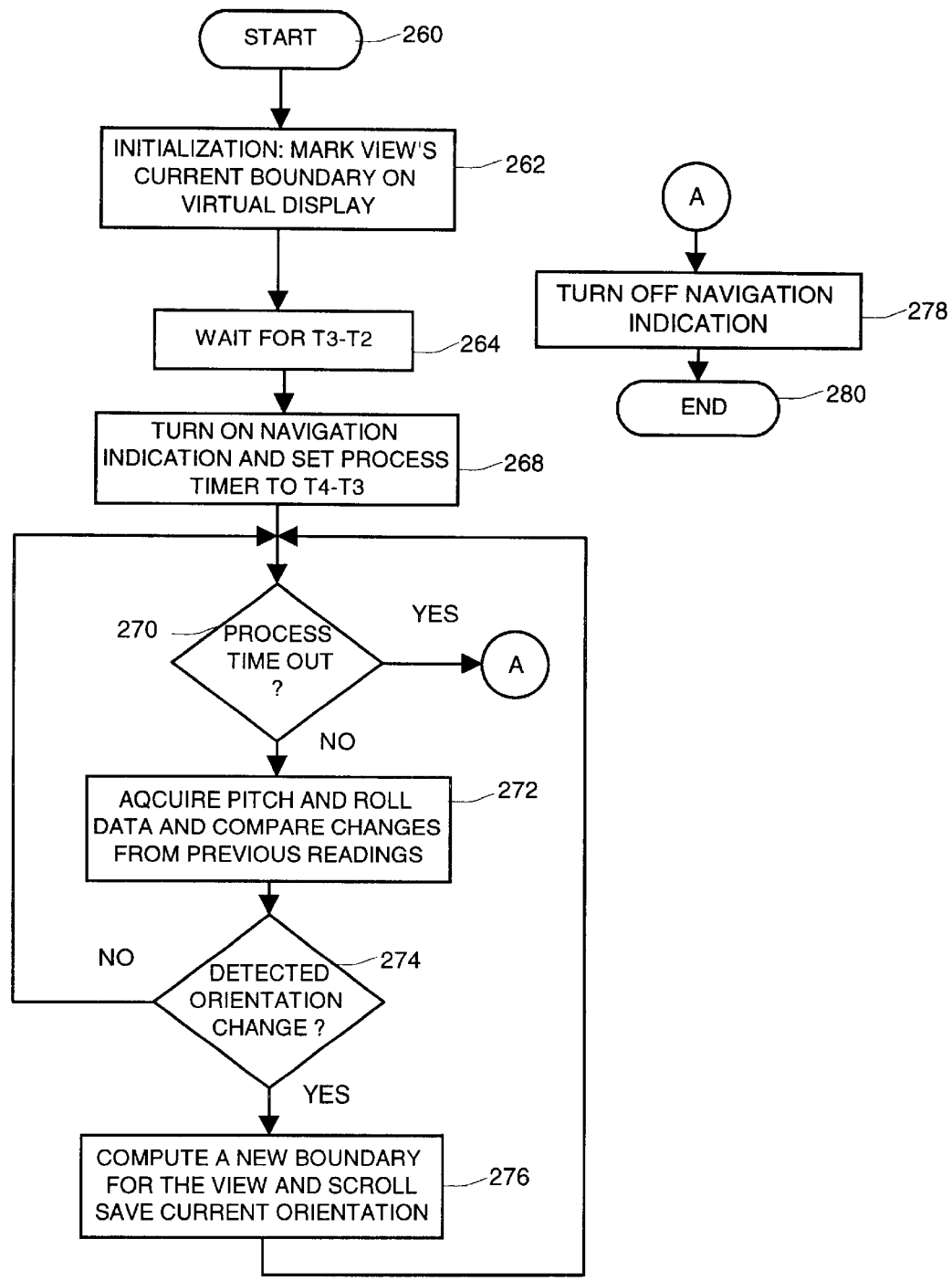
FIG. 13A outlines the software flow diagram for the embodiment of FIG. 12C that remains in view navigation mode only for a fixed time period and then exits to the fixed mode.

FIG. 13A outlines the software flow diagram for the embodiment of FIG. 12C that remains in view navigation mode only for a fixed time period and then exits to the fixed mode. The process starts at block 260 when the micro-controller 100 identifies the finger tapping or the voice command to enter the view navigation mode. At the initialization step at block 262, the current boundary of the display view is marked in comparison to the stored virtual display. A delay corresponding to the time length t3-t2 of FIG. 12 is introduced at block 262 to allow the device some time to stabilize after the finger tap. After the delay, the system is set to view navigation mode in block 268 to start the view navigation. It also provides the visual indication 54 to alert the operator that changes in orientation of the hand-held device will navigate the display. A variation of the process may activate the navigation indication 54 before block 264 but still enter the view navigation mode after the delay in block 264. A process timer is activated at block 268 to limit the stay at view navigation mode to a period of time equal to t4-t3. Block 270 monitors the process timer. If the process timer has not expired, the process continues to block 272 to acquire the pitch and roll orientation data, or in other embodiments of the present invention, the azimuth and inclination data. The process at block 272 also stores the orientation data for the next iteration, and compares the new and old orientation data. If a change in orientation is detected at block 274, the program computes the new boundary for the view at block 276. It also refreshes the display to show the new view, and it saves the new current orientation as the basis for comparison in the next iteration of the process. The process continues with the next iteration at block 270 to check the process timer status. Once the time limit t4-t3 expires, the process turns off the navigation indication 54 at block 278 and the process ends at block 280. Like any other real-time operation, the micro-controller may interrupt the process to perform other tasks. Also, at the end of block 276 the micro-controller may allocate time through its operating system to other tasks, or even just wait for a preset time, to limit the number of iterations of the view navigation process in blocks 270 to 276 that are performed each second. A proper value of iterations per second depends on the selection of a coarse or fine view navigation mode as well as the response time of the orientation sensors, and it can be in the range of 5 to 30 for most practical applications. The advantage of a higher number of iterations per second is that it allows the navigation to match more closely the rotational movements of the hand, at the cost of an increased overhead on the micro-controller operating system.

Figure 13B:
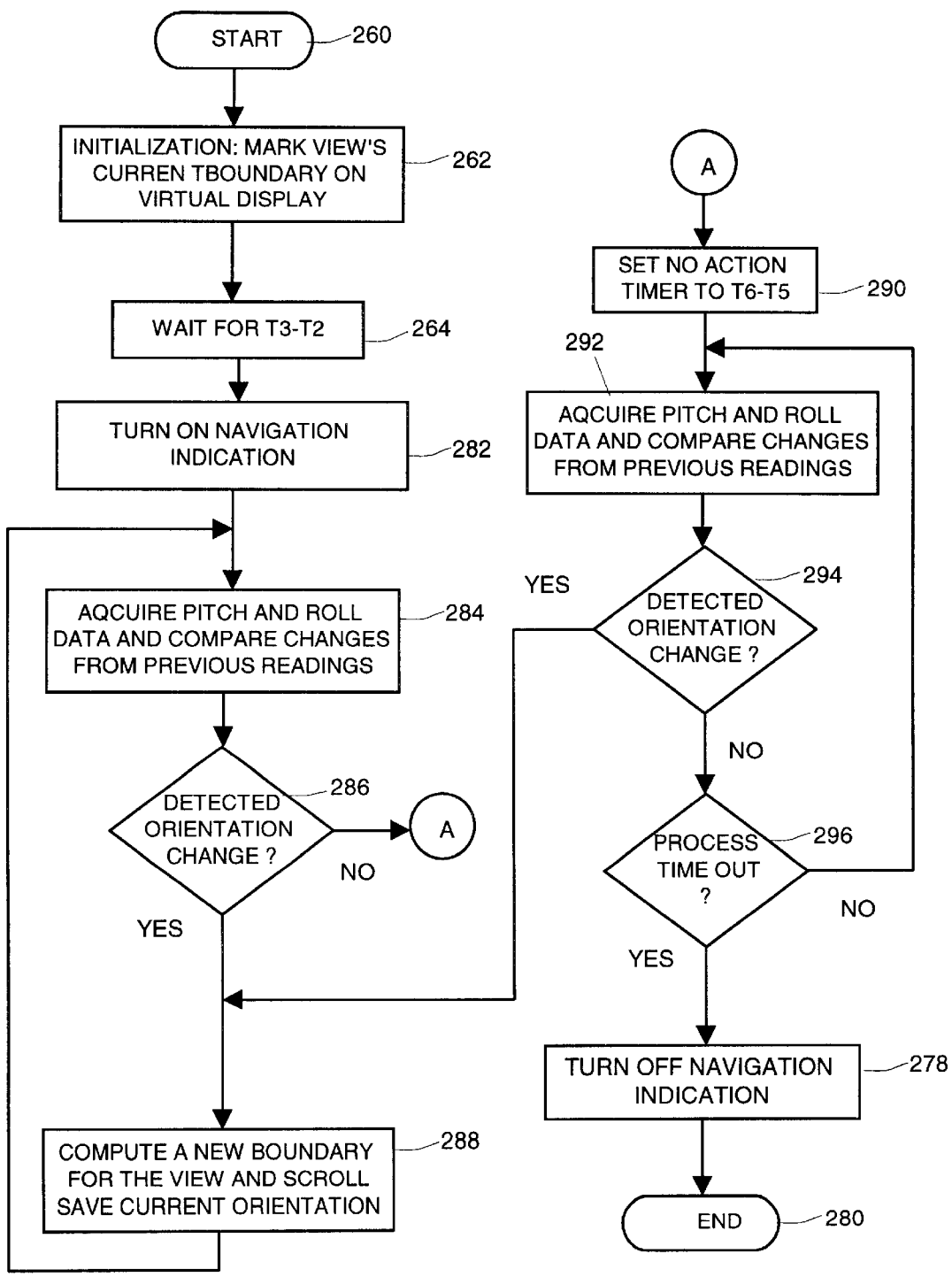
FIG. 13B outlines the software flow diagram for the embodiment of FIG. 12D that remains in view navigation mode as long as the operator continues to change the orientation of the device.

FIG. 13B outlines the software flow diagram for the embodiment of FIG. 12D that remains in view navigation mode as long as the operator continues to change the orientation of the device. Once the operator holds the device relatively steady for a preset time of t6-t5, the view navigation mode terminates. The process starts in blocks 260, 262 and 264 as described in FIG. 13A. At block 282 the process provides the visual indication 54 to alert the operator that changes in orientation of the hand-held device will navigate the display. The acquisition of orientation data in block 284 is similar to the discussion for block 272 of FIG. 13A. If no change is detected in the orientation data at block 286, the process activates the no-action timer of block 290 to t6-t5. It then continues to acquire orientation data in block 292. If no change in the orientation data is detected at block 294, the process checks if the no-action timer has expired. If the timer expired, the view navigation mode ends in block 278 and 280 as described in FIG. 13A.

If a change in orientation is detected at block 286, the program computes the new boundary for the view at block 288 and refreshes the display with the new view. It also saves the new current orientation as the basis for comparison in the next iteration of the process. Similarly, if block 294 detects a change in orientation data, it proceeds to block 288. Block 288 also deactivates the no-action timer of block 290 since a rotational action has been just detected. When reviewing FIG. 13B, one needs to understand that the various processes are scheduled by the operating systems to allow the micro-controller to perform other tasks and limit the number of data acquisitions per second as discussed in FIG. 13A.

FIG. 14 illustrates a further embodiment of the present invention that uses an additional Z-axis accelerometer to identify the operator's vertical hand gestures to enter the view navigation mode and for other commands. The orientation and movement sub-section 420 includes a Z-axis accelerometer 432 set to sense movement at the vertical axis 40 of FIG. 2, in addition to the orientation sensors 82 and 84. The output of the accelerometer 420 is connected to the analog-to-digital converter 434. The analog-to-digital converter provides a digital signal to the micro-controller 100 that is responsive to the device's vertical movements. The program of the micro-controller monitors vertical acceleration changes to detect special hand gestures by the operator. For example, a quick up and down gesture of the operator may indicate a command to enter the view navigation mode. The program may be adapted to identify additional types of hand gestures as different commands. While special hand gestures may be identified by the set of two X and Y accelerometers, the program needs to isolate the hand gesture which is intended as a command from similar signals that are in response to operator navigation of the display. The Z-axis accelerometer 432 provides an extra measurement to allow the program to identify vertical movements from rotational navigation motion. For clarity purposes, FIG. 15 omits the display 12, the display controller 104 and the memory 102 which are still connected to the micro-controller 100 as shown in FIG. 8 and FIG. 5.

Other sensors that provide elevation information can be used instead of the Z-axis accelerometer. This may include an air pressure sensor that is sensitive to changes in air pressure, or a distance detector that measures the distance of the device from the floor.

Figure 15:
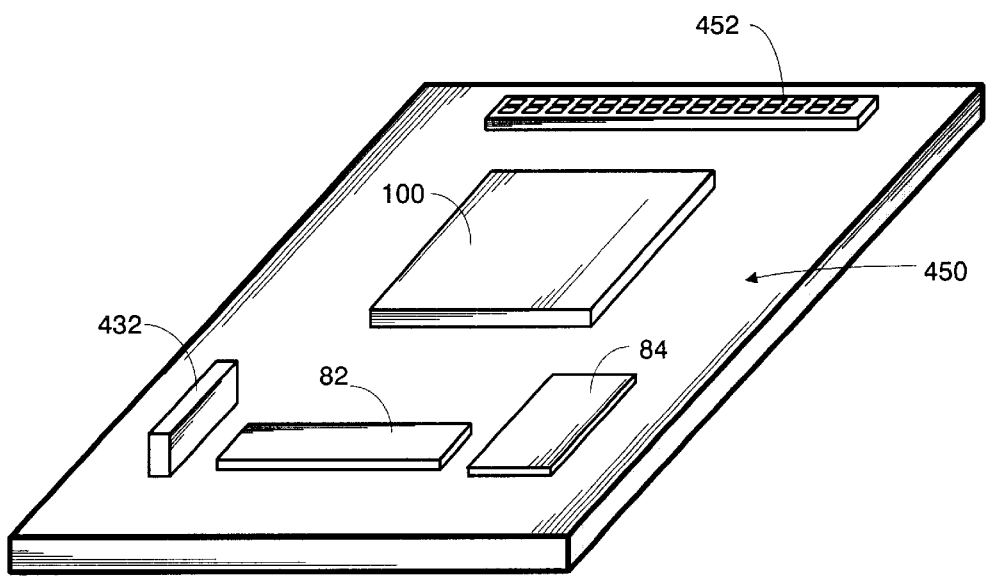
FIG. 15 illustrates the placement of the three accelerometers of the embodiment of FIG. 14 on the main PCB of the hand-held device.

FIG. 15 illustrates the placement of the three accelerometers of the embodiment of FIG. 14 on the main PCB 450 of the hand-held device. The PCB 450 carries the micro-controller 100, connection means 452 for the LCD display as well as other components, which are not shown for clarity. While many commercially available accelerometers incorporate two or more accelerometers on the same chip, the drawing illustrates the placement of the accelerometers assuming one accelerometer per chip. The X-axis accelerometer 82 and the Y-axis accelerometer 84 are placed at a right angle to each other. The Z-axis accelerometer 432 is mounted so that its sensitivity axis is perpendicular to the PCB 450. With high volume manufacturing, all three accelerometers may be incorporated in the same chip.

FIG. 16 is a timing chart illustrating the use of the embodiment of the present invention of FIG. 14 with three accelerometers. FIG. 16A shows the acceleration signal received from the Z-axis accelerometer 432. FIG. 16B shows the signal that represents the change of orientation along the X-axis. FIG. 16C shows the signal that represents the change of orientation along the Y-axis. FIG. 16D is a logic signal indicating with logic "high" when the device is set to the view navigation mode. We assume that the gesture to enter or exit view navigation mode is a rapid vertical up and down motion while the device is at a relatively stable orientation. At period 470, the Z-axis accelerometer exhibits a strong signal 472 that corresponds to a vertical gesture by the operator between time t10 and t11. At the same period, the other accelerometers show signals 474 and 476 since some orientation changes are affected even when the operator tries to keep the device at a relatively stable orientation. The micro-controller's program determines from this combination of signals that a valid operator gesture has been received to enter view navigation mode. After a preset time delay of t12-t11 the program sets the device to the view navigation mode 490 at time t12. The relatively small time delay insures that the program ignores artifacts 478 and 480 which tend to follow the entry gesture. During the view navigation mode, the program acquires the orientation signals 482 and 484 to navigate the display. The program also keeps in storage a short trail of the accelerometer signals.

At time t14, the operator makes another gesture 486. By time t15, the program completed the identification of the gesture and exits the view navigation mode. The program then returns the view to its setting just before the initiation of the gesture at time t14 using the stored trails of the accelerometer signals. The operator is therefore attempting to stabilize the view at time t13 so that the desired final view is present during the period 488 before the gesture to terminate the view navigation mode. If it is not desired to store the data trail of the accelerometers so that the view can be restored after the exit gesture, the exit method of FIG. 12C or FIG. 12D may be used.

Figure 17:
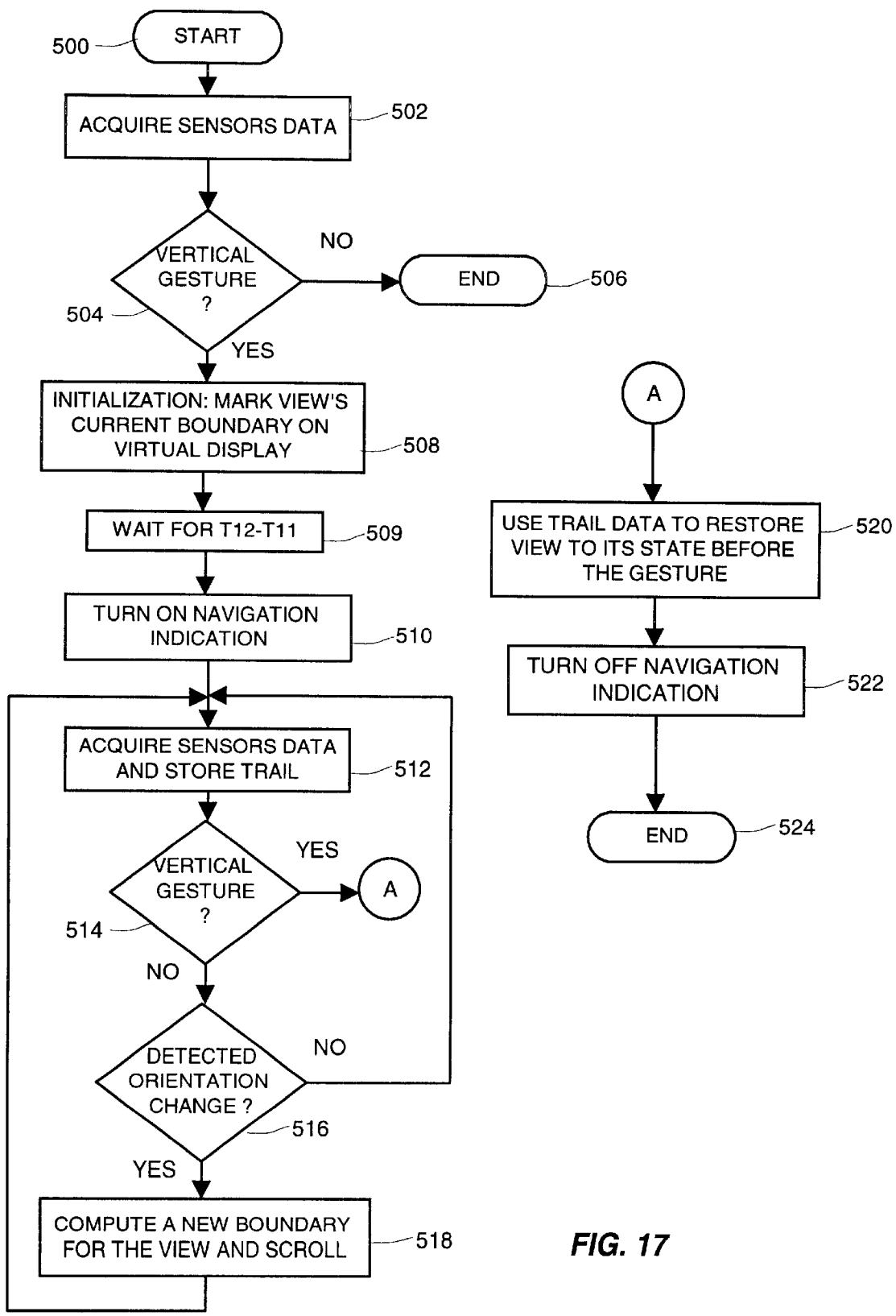
FIG. 17 outlines the software flow diagram for the embodiment of FIG. 14 that uses a vertical movement gesture of the operator to enter and exit the view navigation mode.

FIG. 17 outlines the software flow diagram for the embodiment of FIG. 14 that uses a vertical movement gesture of the operator to enter and exit view navigation mode. The process starts at block 500 in accordance with the overall tasking scheme of the operating systems of the micro-controller 100. The process acquires all sensor data at block 502 and keeps a data trail in memory to allow data shape analysis at block 504. If the analysis currently shows no gesture, the process terminates at block 506. Once block 504 determines that a gesture was made, the process continues with the initialization block 508 where the current boundary of the display view is marked in comparison to the stored virtual display.

A delay corresponding to the time length t12-t11 of FIG. 16 is introduced at block 509 to allow the device some time to stabilize after the gesture. After the delay, the system is set to view navigation mode in block 510 to start the view navigation. It also provides the visual indication 54 to alert the operator that changes in orientation of the hand-held device will navigate the display.

The process acquires all sensor data at block 512 and keeps a data trail in memory to allow gesture shape analysis at block 514. If a change in orientation is detected at block 516, the program computes the new boundary for the view at block 518. It also refreshes the display to show the new view and it saves the new current orientation as the basis for comparison in the next iteration of the process. The process continues with the next iteration at block 512 to continue the navigation of the view. If no change in orientation was detected in block 516, the program continues to monitor the sensors at block 512. If a vertical gesture is detected in block 514, the program uses the data trail from the accelerometers to restore the view to its state just before the gesture 520. It then continues to block 522 to turn off the navigation indication 54 and the process ends at block 524.

Although the description above contains many specifications, these should not be construed as limiting the scope of the invention but as merely providing illustrations of some of the presently preferred embodiments of this invention. For example, while the embodiments above show use of accelerometers, magnetic sensors and inclinometers, various other sensors can be used for acquiring orientation information or elevation information. Also, while a simple hand gesture of up and down movement was described, many other forms of hand gestures can be implemented and detected.

Thus the scope of the invention should be determined by the appended claims and their legal equivalents, rather than by the examples given.

What I claim as my invention is:

1. A view navigation system for a hand-held device having processing means and a display, comprising:
   means for storing a virtual display, said virtual display is larger than said display so that only a portion of said virtual display can be viewed on said display,
   switching means for engaging and disengaging a view navigation mode of operation,
   means for sensing changes in the orientation at which said device is held along two generally perpendicular axes,
   interface means for converting the output of said orientation sensing means to a digital signal connected to said processing means and responsive to said changes in the orientation along said perpendicular axes,
   means for storing and selecting a response curve that continuously correlate changes in orientation to required changes in the viewable portion of said virtual display,
   said processing means is further adapted to navigate the viewable portion of said virtual display in the direction and quantity responsive to said changes in orientation and in accordance with said response curve when said view navigation mode is engaged, and to fix said viewable portion when said view navigation mode is disengaged,
   wherein said response curves change dynamically based on the duration of said view navigation mode.

2. The system of claim 1, wherein said navigation mode further comprises a coarse mode and a fine mode, said coarse mode selects a first stored response curve which causes relatively large changes in view navigation in response to changes in orientation, said fine mode selects a second stored response curve which causes relatively small changes in view navigation in response to changes in orientation, said switching means are further adapted to toggle between said coarse and fine modes when said view navigation mode is engaged.

3. The system of claim 1, wherein said orientation sensing means comprises two accelerometers adapted to sense linear acceleration representing the tilt angle along two generally perpendicular axes and to output digital by signals responsive to changes in said tilt angles.

4. The system of claim 1, wherein said orientation sensing means comprises at least two laser gyro devices adapted to sense angular movement along two generally perpendicular axes and to output digital signals responsive to changes in the angular orientation of said device.

5. The system of claim 1, wherein said orientation sensing means comprises a magnetic direction sensor responsive to the direction of the device relative to the magnetic field of the earth, and wherein said orientation means further comprises a tilt sensor whereby said magnetic direction sensor and said tilt sensor combine to provide orientation change data along two generally perpendicular axes.

6. The system of claim 1, wherein said processing means is further adapted to monitor said changes in orientation to detect a predefined movement pattern of the system in the operator's hand as a gesture to activate said switching means to enter said view navigation mode.

7. The system of claim 6, further comprising a linear movement sensor adapted to measure and output a signal corresponding to a movement of said device along an axis which is generally perpendicular to the plane defined by said two axes, said linear movement signal is connected to said processing means, and said processing means is further adapted to use said linear movement signal to aid in the identification of said predefined operator's gesture command to enter or to exit said view navigation mode.

8. The system of claim 6, further comprising means for measuring and producing a digital signal responsive to the elevation of said device above ground, said elevation signal is connected to said processing means, and said processing means is further adapted to use said elevation signal to aid in the identification of said predefined operator's gesture command to enter or to exit said view navigation mode.

9. The system of claim 6, wherein said processing means is further adapted to store a continuous trail of the view navigation path across said virtual display during said view navigation mode, said processing means is further adapted to identify an operator's gesture to exit said view navigation mode, and said processing means is further adapted upon identification of said exit gesture to access said continuous trail and to retrieve and to restore the state of the view just before the initiation of said exit gesture.

10. The system of claim 1, wherein said processing means is adapted to insert a preset time delay between the time of acceptance of a command to enter said view navigation mode and the actual initiation of said view navigation mode to allow sufficient time for any artifact rotational signals due to the entry command to subside.

11. The system of claim 1, wherein said processing means is further adapted to measure time, and wherein said processing means keeps said view navigation mode activated for only a preset period of time in response to a command to activate said view navigation mode.

12. The system of claim 1, wherein said processing means is further adapted to measure time, and wherein said view navigation mode remains set until said processing means determines that the operator stops changing the orientation of said device for a period of time exceeding a preset time limit.

13. A view navigation system for a hand-held device having processing means and a display, comprising:
   means for storing a virtual display, said virtual display is larger than said display so that only a portion of said virtual display can be viewed on said display,
   means for detecting the characteristic sound and vibration pattern of an operator's finger tap on the housing of said device to activate a view navigation mode of operation in response to a finger tap with sound intensity above a preset threshold limit,
   means for sensing changes in the orientation at which said device is held along two generally perpendicular axes,
   interface means for converting the output of said orientation sensing means to a digital signal connected to said processing means and responsive to said changes in the orientation along said perpendicular axes,
   means for storing and selecting a response curve that continuously correlate changes in orientation to required changes in the viewable portion of said virtual display, said processing means is further adapted to navigate the viewable portion of said virtual display in the direction and quantity responsive to said changes in orientation and in accordance with said response curve when said view navigation mode is engaged, and to fix said viewable portion when said view navigation mode is disengaged.

14. The systems of claim 13, wherein said means for detecting the sound and vibration pattern of a finger tap comprises:
means for converting finger tap vibrations to a corresponding electrical signal,
amplifying means connected to said converting means to amplify said electrical signal which exceeds said threshold limit,
low pass filter adapted to pass only low frequency signals connected to said amplifying means,
means for converting the output of said low pass filter to a digital signal connected to said processing means, said processing means further adapted to compare said signal to a template of a characteristic signal of a finger tap whereby it can identify the occurrence of a valid finger tap.

15. The system of claim 13, wherein said response curve changes dynamically based on the duration of said view navigation mode.

16. The system of claim 13, wherein said orientation sensing means comprises two accelerometers adapted to sense linear acceleration representing the tilt angle along two generally perpendicular axes and to output digital signals responsive to changes in said tilt angles.

17. The system of claim 13, wherein said orientation sensing means comprises at least two laser gyro devices adapted to sense angular movement along two generally perpendicular axes and to output digital signals responsive to changes in the angular orientation of said device.

18. The system of claim 13, wherein said processing means is further adapted to store a continuous trail of the view navigation path across said virtual display during said view navigation mode, said processing means is further adapted to identify an operator's finger tap during said navigation mode as a command to exit said view navigation mode, and said processing means is further adapted upon identification of said exit command to access said continuous trail and to retrieve and to restore the state of the view just before the initiation of said exit finger tap.

19. The system of claim 13, wherein said processing means is adapted to insert a preset time delay between the time of acceptance of a command to enter said view navigation mode and the actual initiation of said view navigation mode to allow sufficient time for any artifact rotational signals due to the entry command to subside.

20. The system of claim 13, wherein said processing means is further adapted to measure time, and wherein said processing means keeps said view navigation mode activated for only a preset period of time in response to a command to activate said view navigation mode.

21. The system of claim 13, wherein said processing means is further adapted to measure time, and wherein said view navigation mode remains set until said processing means determines that the operator stops changing the orientation of said device for a period of time exceeding a preset time limit.

22. A method of navigating the view of the display of a hand-held device, comprising:
creating a virtual display and marking the boundary of the initial portion of said virtual display to be viewed on said display,
identifying an operator's command to enter a view navigation mode during which the displayed view is navigating said virtual display in any desired direction,
acquiring the rotational orientation of said device during said view navigation mode, and identifying changes in said orientation along two generally perpendicular axes,
computing changes in view boundary in response to changes in said rotational orientation of said device based on a stored response curve, said response curve changes dynamically based on the duration of said view navigation mode,
outputting a new view to said display reflecting said computed view boundary, and
returning the display to a fixed view at the termination of said view navigation mode.

23. The method of claim 22, wherein said navigation mode further comprises a coarse mode and a fine mode, said step of identifying an operator's command is further adapted to select between said coarse and fine modes, and said step of computing changes in view boundary selects a relatively large response ratio when said coarse mode is selected and a relatively small response ratio when said fine mode is selected.

24. The method of claim 22, wherein said step of identifying an operator's command to enter view navigation mode further magnifies the previous view of said display before view navigation commences.

25. The method of claim 22, further comprising the step of activating a visual indication on said display when said view navigation mode is engaged, whereby the user is alerted that changes in orientation of the device will navigate the view.

26. The method of claim 22, wherein said step of identifying an operator's command is further adapted to monitor said changes in orientation to detect a predefined movement pattern of said device in the operator's hand as a gesture command to enter said view navigation mode.

27. The method of claim 22, further comprising the step of storing a continuous trail of the view navigation path across said virtual display during said view navigation mode, said step of returning the display to a fixed view is further adapted to access said continuous trail and to retrieve and to restore the state of the view just before operator initiated the exit command.

28. The method of claim 22, further comprising the step of introducing a relatively short time delay from the identification of said operator's command to enter said view navigation mode and the actual start of the view navigation to allow sufficient time for any artifact rotational signals due to the entry command to subside.

29. The method of claim 22, wherein said view navigation mode is terminating automatically after the expiration of a preset time since its initiation.

30. The method of claim 22, wherein said view navigation mode is terminating if the orientation of said device is not changing for a period longer than a preset time limit.

31. A view navigation system for a hand-held device having processing means and a display, comprising:
means for storing a virtual display, said virtual display is larger than said display so that only a portion of said virtual display can be viewed on said display,
switching means for engaging and disengaging a view navigation mode of operation,
means for sensing changes in the orientation at which said device is held along two generally perpendicular axes, interface means for converting the output of said orientation sensing means to a digital signal connected to said processing means and responsive to said changes in the orientation along said perpendicular axes, means for storing and selecting a response curve that continuously correlate changes in orientation to required changes in the viewable portion of said virtual display, said processing means is further adapted to navigate the viewable portion of said virtual display in the direction and quantity responsive to said changes in orientation and in accordance with said response curve when said view navigation mode is engaged, and to fix said viewable portion when said view navigation mode is disengaged wherein said processing means is further adapted to store a continuous trail of the view navigation path across said virtual display during said view navigation mode, wherein said processing means is further adapted to identify an operator's gesture to exit said view navigation mode, and wherein said processing means is further adapted upon identification of said exit gesture to access said continuous trail and to retrieve and to restore the state of the view just before the initiation of said exit gesture.

32. The system of claim 31, wherein said navigation mode further comprises a coarse mode and a fine mode, said coarse mode selects a first stored response curve which causes relatively large changes in view navigation in response to changes in orientation, said fine mode selects a second stored response curve which causes relatively small changes in view navigation in response to changes in orientation, said switching means are further adapted to toggle between said coarse and fine modes when said view navigation mode is engaged.

33. The system of claim 31, wherein said response curves change dynamically based on the duration of said view navigation mode.

34. The system of claim 31, wherein said orientation sensing means comprises two accelerometers adapted to sense linear acceleration representing the tilt angle along two generally perpendicular axes and to output digital signals responsive to changes in said tilt angles.

35. The system of claim 31, wherein said orientation sensing means comprises at least two laser gyro devices adapted to sense angular movement along two generally perpendicular axes and to output digital signals responsive to changes in the angular orientation of said device.

36. The system of claim 31, wherein said orientation sensing means comprises a magnetic direction sensor responsive to the direction of the device relative to the magnetic field of the earth, and wherein said orientation means further comprises a tilt sensor whereby said magnetic direction sensor and said tilt sensor combine to provide orientation change data along two generally perpendicular axes.

37. The system of claim 31, wherein said processing means is further adapted to monitor said changes in orientation to detect a predefined movement pattern of the system in the operator's hand as a gesture to activate said switching means to enter or to exit said view navigation mode.

38. The system of claim 37, further comprising a linear movement sensor adapted to measure and output a signal corresponding to a movement of said device along an axis which is generally perpendicular to the plane defined by said two axes, said linear movement signal is connected to said processing means, and said processing means is further adapted to use said linear movement signal to aid in the identification of said predefined operator's gesture command to enter or to exit said view navigation mode.

39. The system of claim 37, further comprising means for measuring and producing a digital signal responsive to the elevation of said device above ground, said elevation signal is connected to said processing means, and said processing means is further adapted to use said elevation signal to aid in the identification of said predefined operator's gesture command to enter or to exit said view navigation mode.

40. The system of claim 31, wherein said processing means is adapted to insert a preset time delay between the time of acceptance of a command to enter said view navigation mode and the actual initiation of said view navigation mode to allow sufficient time for any artifact rotational signals due to the entry command to subside.

41. The system of claim 31, wherein said processing means is further adapted to measure time, and wherein said processing means keeps said view navigation mode activated for only a preset period of time in response to a command to activate said view navigation mode.

42. The system of claim 31, wherein said processing means is further adapted to measure time, and wherein said view navigation mode remains set until said processing means determines that the operator stops changing the orientation of said device for a period of time exceeding a preset time limit.

* * * * *

UNITED STATES PATENT AND TRADEMARK OFFICE
CERTIFICATE OF CORRECTION

PATENT NO.   : 6,466,198 B1
DATED        : October 15, 2002
INVENTOR(S)  : David Y. Feinstein It is certified that error appears in the above-identified patent and that said Letters Patent is hereby corrected as shown below:

<u>Title page,</u>
Item [30], Related U.S. Application Data, delete "Provisional application No. 60/163,755, filed on Nov. 5, 1999."

Signed and Sealed this

Eighteenth Day of March, 2003

JAMES E. ROGAN
*Director of the United States Patent and Trademark Office*